US009390587B2

(12) United States Patent
Saunders

(10) Patent No.: US 9,390,587 B2
(45) Date of Patent: Jul. 12, 2016

(54) GAMING SYSTEM AND METHOD FOR PROVIDING A CASCADING SYMBOL GAME WITH MULTIPLE SYMBOL DISPLAY POSITION SYMBOLS

(71) Applicant: IGT, Las Vegas, NV (US)

(72) Inventor: Brian F. Saunders, Sunnyvale, CA (US)

(73) Assignee: IGT, Las Vegas, NV (US)

( * ) Notice: Subject to any disclaimer, the term of this patent is extended or adjusted under 35 U.S.C. 154(b) by 380 days.

(21) Appl. No.: 14/028,725

(22) Filed: Sep. 17, 2013

(65) Prior Publication Data

US 2015/0080091 A1 Mar. 19, 2015

(51) Int. Cl.
*A63F 13/00* (2014.01)
*G07F 17/32* (2006.01)

(52) U.S. Cl.
CPC .................................... *G07F 17/326* (2013.01)

(58) Field of Classification Search
CPC ........................... G07F 17/3244; G07F 17/326
USPC ................................................ 463/16, 20, 31
See application file for complete search history.

(56) References Cited

U.S. PATENT DOCUMENTS 4,099,722 A 7/1978 Rodesch et al.
4,200,291 A 4/1980 Hooker
4,357,567 A 11/1982 Rock
4,636,951 A 1/1987 Harlick
4,695,053 A 9/1987 Vazquez et al.
4,775,155 A 10/1988 Lees
4,790,537 A 12/1988 Smyth et al.
4,805,907 A 2/1989 Hagiwara
4,826,169 A 5/1989 Bessho et al.
4,856,787 A 8/1989 Itkis
4,871,171 A 10/1989 Rivero
4,874,164 A 10/1989 Miner et al.
4,874,173 A 10/1989 Kishishita
5,083,271 A 1/1992 Thacher et al.
5,205,555 A 4/1993 Hamano
RE34,244 E 5/1993 Hagiwara
5,242,163 A 9/1993 Fulton
5,259,613 A 11/1993 Marnell, II
5,297,252 A 3/1994 Becker
5,356,140 A 10/1994 Dabrowski et al.
5,393,057 A 2/1995 Marnell, II
5,395,111 A 3/1995 Inoue
5,408,600 A 4/1995 Garfinkel et al.
5,411,271 A 5/1995 Mirando
5,471,577 A 11/1995 Lightbody et al.

(Continued)

FOREIGN PATENT DOCUMENTS

AU 755879 2/2001
AU 2002310115 6/2006

(Continued)

*Primary Examiner* — James S McClellan
(74) *Attorney, Agent, or Firm* — Neal, Gerber & Eisenberg LLP

(57) ABSTRACT

A gaming system including a cascading symbol or tumbling reel game which utilizes zero, one or more multiple symbol display position symbols. Each multiple symbol display position symbol is configured to occupy or span a plurality of symbol display positions of a symbol display position matrix. For a generated multiple symbol display position symbol to be removed from the symbol display matrix, each of the individual symbols of the multiple symbol display position symbol must individually qualify to be removed from the symbol display matrix.

23 Claims, 10 Drawing Sheets

(56) References Cited

U.S. PATENT DOCUMENTS

| | | | |
|---|---|---|---|
| 5,536,016 | A | 7/1996 | Thompson |
| 5,564,700 | A | 10/1996 | Celona |
| 5,609,337 | A | 3/1997 | Clapper, Jr. |
| 5,611,730 | A | 3/1997 | Weiss |
| 5,624,119 | A | 4/1997 | Leake |
| 5,630,753 | A | 5/1997 | Fuchs |
| 5,639,089 | A | 6/1997 | Matsumoto et al. |
| 5,645,486 | A | 7/1997 | Nagao et al. |
| 5,647,798 | A | 7/1997 | Falciglia |
| 5,664,998 | A | 9/1997 | Seelig et al. |
| 5,704,835 | A | 1/1998 | Dietz, II |
| 5,720,662 | A | 2/1998 | Holmes et al. |
| 5,722,891 | A | 3/1998 | Inoue |
| 5,741,183 | A | 4/1998 | Acres et al. |
| 5,755,619 | A | 5/1998 | Matsumoto et al. |
| 5,769,716 | A | 6/1998 | Saffari et al. |
| 5,779,544 | A | 7/1998 | Seelig et al. |
| 5,779,549 | A | 7/1998 | Walker et al. |
| 5,788,573 | A | 8/1998 | Baerlocher et al. |
| 5,790,818 | A | 8/1998 | Martin |
| 5,791,992 | A | 8/1998 | Crump et al. |
| 5,807,172 | A | 9/1998 | Piechowiak |
| 5,813,911 | A | 9/1998 | Margolin |
| 5,820,460 | A | 10/1998 | Fulton |
| 5,823,874 | A | 10/1998 | Adams |
| 5,829,749 | A | 11/1998 | Hobert et al. |
| 5,833,536 | A | 11/1998 | Davids et al. |
| 5,833,537 | A | 11/1998 | Barrie |
| 5,848,932 | A | 12/1998 | Adams |
| 5,851,148 | A | 12/1998 | Brune et al. |
| 5,882,260 | A | 3/1999 | Marks et al. |
| 5,882,261 | A | 3/1999 | Adams |
| 5,890,962 | A | 4/1999 | Takemoto |
| 5,923,379 | A | 7/1999 | Patterson |
| 5,927,714 | A | 7/1999 | Kaplan |
| 5,934,672 | A | 8/1999 | Sines et al. |
| 5,935,002 | A | 8/1999 | Falciglia |
| 5,947,820 | A | 9/1999 | Morro et al. |
| 5,951,397 | A | 9/1999 | Dickinson |
| 5,957,775 | A | 9/1999 | Cherry |
| 5,980,384 | A | 11/1999 | Barrie |
| 5,984,779 | A | 11/1999 | Bridgeman et al. |
| 5,995,146 | A | 11/1999 | Rasmussen |
| 5,997,401 | A | 12/1999 | Crawford |
| 6,001,016 | A | 12/1999 | Walker et al. |
| 6,004,208 | A | 12/1999 | Takemoto et al. |
| 6,006,252 | A | 12/1999 | Wolfe |
| 6,019,369 | A | 2/2000 | Nakagawa et al. |
| 6,039,648 | A | 3/2000 | Guinn et al. |
| 6,059,658 | A | 5/2000 | Mangano et al. |
| 6,089,976 | A | 7/2000 | Schneider et al. |
| 6,089,977 | A | 7/2000 | Bennett |
| 6,089,978 | A | 7/2000 | Adams |
| 6,089,981 | A | 7/2000 | Brenner et al. |
| 6,093,102 | A | 7/2000 | Bennett |
| 6,117,013 | A | 9/2000 | Eiba |
| 6,120,377 | A | 9/2000 | McGinnis, Sr. et al. |
| 6,135,884 | A | 10/2000 | Hedrick et al. |
| 6,139,124 | A | 10/2000 | Kling |
| 6,142,872 | A | 11/2000 | Walker et al. |
| 6,159,095 | A | 12/2000 | Frohm et al. |
| 6,174,235 | B1 | 1/2001 | Walker et al. |
| 6,186,894 | B1 | 2/2001 | Mayeroff |
| 6,203,009 | B1 | 3/2001 | Sines et al. |
| 6,203,427 | B1 | 3/2001 | Walker et al. |
| 6,203,428 | B1 | 3/2001 | Giobbi et al. |
| 6,203,430 | B1 | 3/2001 | Walker et al. |
| 6,220,959 | B1 | 4/2001 | Holmes et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,227,971 | B1 | 5/2001 | Weiss |
| 6,231,442 | B1 | 5/2001 | Mayeroff |
| 6,241,607 | B1 | 6/2001 | Payne et al. |
| 6,251,013 | B1 | 6/2001 | Bennett |
| 6,254,481 | B1 | 7/2001 | Jaffe |
| 6,270,412 | B1 | 8/2001 | Crawford et al. |
| 6,302,790 | B1 | 10/2001 | Brossard |
| 6,311,976 | B1 | 11/2001 | Yoseloff et al. |
| 6,315,660 | B1 | 11/2001 | DeMar et al. |
| 6,315,666 | B1 | 11/2001 | Mastera et al. |
| 6,318,721 | B1 | 11/2001 | Randall et al. |
| 6,322,445 | B1 | 11/2001 | Miller |
| 6,338,678 | B1 | 1/2002 | Seelig et al. |
| 6,347,996 | B1 | 2/2002 | Gilmore et al. |
| 6,354,941 | B2 | 3/2002 | Miller et al. |
| 6,358,144 | B1 | 3/2002 | Kadlic et al. |
| 6,364,766 | B1 | 4/2002 | Anderson et al. |
| 6,368,216 | B1 | 4/2002 | Hedrick et al. |
| 6,373,500 | B1 | 4/2002 | Daniels |
| 6,375,570 | B1 | 4/2002 | Poole |
| 6,379,246 | B1 | 4/2002 | Dabrowski |
| 6,394,902 | B1 | 5/2002 | Glavich et al. |
| 6,398,644 | B1 | 6/2002 | Perrie et al. |
| 6,398,664 | B1 | 6/2002 | Choi |
| 6,409,602 | B1 | 6/2002 | Wiltshire et al. |
| 6,413,162 | B1 | 7/2002 | Baerlocher et al. |
| 6,419,579 | B1 | 7/2002 | Bennett |
| 6,464,581 | B1 | 10/2002 | Yoseloff et al. |
| 6,508,709 | B1 | 1/2003 | Karmarkar |
| 6,514,144 | B2 | 2/2003 | Riendeau et al. |
| 6,517,432 | B1 | 2/2003 | Jaffe |
| 6,561,900 | B1 | 5/2003 | Baerlocher et al. |
| 6,604,740 | B1 | 8/2003 | Singer et al. |
| 6,634,945 | B2 | 10/2003 | Glavich et al. |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,666,767 | B1 | 12/2003 | Dayan |
| 6,672,690 | B1 | 1/2004 | Williams |
| 6,676,511 | B2 | 1/2004 | Payne et al. |
| 6,676,512 | B2 | 1/2004 | Fong et al. |
| 6,695,696 | B1 | 2/2004 | Kaminkow |
| 6,702,671 | B2 | 3/2004 | Tarantino |
| 6,712,693 | B1 | 3/2004 | Hettinger |
| 6,715,756 | B2 | 4/2004 | Inoue |
| 6,731,313 | B1 | 5/2004 | Kaminkow |
| 6,769,982 | B1 | 8/2004 | Brosnan |
| 6,805,349 | B2 | 10/2004 | Baerlocher et al. |
| 6,805,629 | B1 | 10/2004 | Weiss |
| 6,819,345 | B1 | 11/2004 | Jones et al. |
| 6,832,957 | B2 | 12/2004 | Falconer |
| 6,855,054 | B2 | 2/2005 | White et al. |
| 6,860,810 | B2 | 3/2005 | Cannon et al. |
| 6,875,106 | B2 | 4/2005 | Weiss et al. |
| 6,896,617 | B2 | 5/2005 | Daly |
| 6,905,405 | B2 | 6/2005 | McClintic |
| 6,910,962 | B2 | 6/2005 | Marks et al. |
| 6,921,334 | B1 | 7/2005 | Bennett |
| 6,928,413 | B1 | 8/2005 | Pulitzer |
| 6,942,571 | B1 | 9/2005 | McAllister et al. |
| 6,942,574 | B1 | 9/2005 | LeMay et al. |
| 6,960,133 | B1 | 11/2005 | Marks et al. |
| 6,981,635 | B1 | 1/2006 | Hughs-Baird et al. |
| 6,988,947 | B2 | 1/2006 | Baerlocher et al. |
| 7,014,560 | B2 | 3/2006 | Glavich et al. |
| 7,052,395 | B2 | 5/2006 | Glavich et al. |
| 7,070,502 | B1 | 7/2006 | Bussick et al. |
| 7,077,745 | B2 | 7/2006 | Gomez et al. |
| 7,108,602 | B2 | 9/2006 | Daly |
| 7,125,333 | B2 | 10/2006 | Brosnan |
| 7,144,322 | B2 | 12/2006 | Gomez et al. |
| 7,195,559 | B2 | 3/2007 | Gilmore et al. |
| 7,252,591 | B2 | 8/2007 | Van Asdale |
| 7,281,977 | B2 | 10/2007 | Jones |
| 7,294,058 | B1 | 11/2007 | Slomiany et al. |
| 7,311,607 | B2 | 12/2007 | Tedsen et al. |
| 7,357,713 | B2 | 4/2008 | Marks et al. |
| 7,402,102 | B2 | 7/2008 | Marks et al. |
| 7,585,219 | B2 | 9/2009 | Randall et al. |
| 7,591,724 | B2 | 9/2009 | Baerlocher |
| 7,611,406 | B2 | 11/2009 | Fuller |
| 7,625,281 | B2 | 12/2009 | Bilyeu et al. |

(56) References Cited

U.S. PATENT DOCUMENTS

| | | | |
|---|---|---|---|
| 7,666,085 | B2 | 2/2010 | Vorias et al. |
| 7,695,363 | B2 | 4/2010 | Gilliland et al. |
| 7,699,698 | B2 | 4/2010 | Randall |
| 7,699,699 | B2 | 4/2010 | Gilliland et al. |
| 7,717,787 | B2 | 5/2010 | Walker et al. |
| 7,740,536 | B2 | 6/2010 | Pederson et al. |
| 7,749,063 | B2 | 7/2010 | Belger et al. |
| 7,753,773 | B2 | 7/2010 | Baerlocher et al. |
| 7,805,680 | B2 | 9/2010 | Meyers et al. |
| 7,914,376 | B2 | 3/2011 | Walker et al. |
| 7,918,738 | B2 | 4/2011 | Paulsen |
| 7,950,994 | B2 | 5/2011 | Berman et al. |
| 8,002,625 | B2 | 8/2011 | Maya |
| 8,007,357 | B2 | 8/2011 | Cuddy et al. |
| 8,021,226 | B2 | 9/2011 | Souza et al. |
| 8,083,581 | B2 | 12/2011 | Marks et al. |
| 8,096,877 | B2 | 1/2012 | Hoffman |
| 8,105,151 | B2 | 1/2012 | Caputo et al. |
| 8,152,623 | B2 | 4/2012 | Fiden |
| 8,162,741 | B2 | 4/2012 | Wadleigh et al. |
| 8,171,158 | B1 | 5/2012 | Grignetti |
| 8,172,665 | B2 | 5/2012 | Hoffman et al. |
| 8,192,272 | B2 | 6/2012 | Thomas et al. |
| 8,192,275 | B2 | 6/2012 | Aoki et al. |
| 8,221,206 | B2 | 7/2012 | Marks et al. |
| 8,226,468 | B2 | 7/2012 | Hoffman et al. |
| 8,277,308 | B2 | 10/2012 | Baerlocher et al. |
| 8,287,357 | B2 | 10/2012 | Evans |
| 8,323,091 | B2 | 12/2012 | Frank et al. |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,444,473 | B2 | 5/2013 | Ching et al. |
| 8,512,138 | B2 | 8/2013 | Saunders |
| 8,602,871 | B2 | 12/2013 | Wadleigh et al. |
| 2001/0004609 | A1 | 6/2001 | Walker et al. |
| 2001/0034268 | A1 | 10/2001 | Thomas et al. |
| 2001/0049305 | A1 | 12/2001 | Riendeau et al. |
| 2002/0045472 | A1 | 4/2002 | Adams |
| 2002/0068623 | A1 | 6/2002 | Gauselmann |
| 2002/0077165 | A1 | 6/2002 | Bansemer et al. |
| 2002/0086725 | A1 | 7/2002 | Fasbender et al. |
| 2002/0087403 | A1 | 7/2002 | Meyers et al. |
| 2002/0151363 | A1 | 10/2002 | Letovsky et al. |
| 2003/0008698 | A1 | 1/2003 | Stone |
| 2003/0027622 | A1 | 2/2003 | Osawa |
| 2003/0027623 | A1 | 2/2003 | Rose |
| 2003/0036422 | A1 | 2/2003 | Baerlocher et al. |
| 2003/0045345 | A1 | 3/2003 | Bermin |
| 2003/0054874 | A1 | 3/2003 | Kaminkow |
| 2003/0057645 | A1 | 3/2003 | Baerlocher |
| 2003/0060267 | A1 | 3/2003 | Glavich |
| 2003/0064772 | A1 | 4/2003 | Tempest et al. |
| 2003/0100356 | A1 | 5/2003 | Brown et al. |
| 2003/0157981 | A1 | 8/2003 | Marks et al. |
| 2004/0033829 | A1 | 2/2004 | Pacey et al. |
| 2004/0043809 | A1 | 3/2004 | Gomez et al. |
| 2004/0048646 | A1 | 3/2004 | Visocnik |
| 2004/0048650 | A1 | 3/2004 | Mierau et al. |
| 2004/0048651 | A1 | 3/2004 | Vorias et al. |
| 2004/0072619 | A1 | 4/2004 | Brosnan et al. |
| 2004/0097280 | A1 | 5/2004 | Gauselmann |
| 2004/0137978 | A1 | 7/2004 | Cole et al. |
| 2005/0037836 | A1 | 2/2005 | Gilmore et al. |
| 2005/0054418 | A1 | 3/2005 | Baerlocher |
| 2005/0059478 | A1 | 3/2005 | Peterson et al. |
| 2005/0119052 | A1 | 6/2005 | Russell et al. |
| 2005/0148378 | A1 | 7/2005 | Fasbender et al. |
| 2005/0148381 | A1 | 7/2005 | Marks et al. |
| 2005/0239530 | A1 | 10/2005 | Walker et al. |
| 2005/0282620 | A1 | 12/2005 | Marks et al. |
| 2005/0288094 | A1 | 12/2005 | Marks et al. |
| 2006/0046830 | A1 | 3/2006 | Webb |
| 2006/0068881 | A1 | 3/2006 | Casey |
| 2006/0068886 | A1 | 3/2006 | Takano et al. |
| 2006/0143085 | A1 | 6/2006 | Adams et al. |
| 2006/0172795 | A1 | 8/2006 | Bussick et al. |
| 2007/0026933 | A1 | 2/2007 | Tanimura |
| 2007/0060248 | A1 | 3/2007 | Rodgers et al. |
| 2007/0155474 | A1 | 7/2007 | Gauselmann |
| 2008/0045309 | A1 | 2/2008 | Okada |
| 2008/0051174 | A1 | 2/2008 | Fiden |
| 2008/0090655 | A1 | 4/2008 | Marks et al. |
| 2008/0108409 | A1 | 5/2008 | Cole et al. |
| 2008/0113735 | A1 | 5/2008 | Maya |
| 2008/0182644 | A1 | 7/2008 | Lutnick et al. |
| 2008/0188286 | A1 * | 8/2008 | Jaffe .................. G07F 17/3265 463/20 |
| 2008/0227521 | A1 | 9/2008 | Aoki et al. |
| 2009/0104964 | A1 | 4/2009 | Snow |
| 2009/0124325 | A1 * | 5/2009 | Wadleigh ................ G07F 17/34 463/20 |
| 2009/0124342 | A1 | 5/2009 | Fong |
| 2009/0124347 | A1 | 5/2009 | Rodgers et al. |
| 2009/0227337 | A1 | 9/2009 | Langille et al. |
| 2010/0022297 | A1 | 1/2010 | Saunders |
| 2010/0029364 | A1 | 2/2010 | Zielinski |
| 2010/0120507 | A1 | 5/2010 | Rodgers et al. |
| 2010/0124972 | A1 | 5/2010 | Rodgers |
| 2010/0234089 | A1 | 9/2010 | Saffari et al. |
| 2010/0234091 | A1 | 9/2010 | Baerlocher et al. |
| 2011/0111825 | A1 | 5/2011 | Caputo |
| 2011/0130193 | A1 | 6/2011 | Belger et al. |
| 2012/0172106 | A1 | 7/2012 | Caputo et al. |
| 2013/0053122 | A1 | 2/2013 | Spark-Stahl et al. |
| 2013/0053128 | A1 | 2/2013 | Spark-Stahl et al. |
| 2013/0143635 | A1 | 6/2013 | Arora et al. |
| 2013/0190066 | A1 | 7/2013 | Saunders et al. |
| 2013/0190067 | A1 | 7/2013 | Saunders |
| 2013/0217463 | A1 | 8/2013 | Hughes et al. |

FOREIGN PATENT DOCUMENTS

| | | |
|---|---|---|
| CA | 2285752 | 4/2000 |
| DE | 4446139 | 7/1995 |
| DE | 19640860 | 4/1998 |
| EP | 0058488 | 8/1982 |
| EP | 0060019 | 9/1982 |
| EP | 1063622 | 12/2000 |
| GB | 1242298 | 8/1971 |
| GB | 1454046 | 10/1976 |
| GB | 2062922 | 5/1981 |
| GB | 2106293 | 9/1981 |
| GB | 2097160 | 10/1982 |
| GB | 2106295 | 4/1983 |
| GB | 2117952 | 10/1983 |
| GB | 2137392 | 10/1984 |
| GB | 2157047 | 10/1985 |
| GB | 2165385 | 4/1986 |
| GB | 2180087 | 8/1989 |
| GB | 2243236 | 4/1990 |
| GB | 2226436 | 6/1990 |
| GB | 2242300 | 9/1991 |
| GB | 2372132 | 2/2001 |
| WO | WO 95/19595 | 7/1995 |
| WO | WO 95/24796 | 9/1995 |
| WO | WO 98/20949 | 5/1998 |
| WO | WO 00/12186 | 3/2000 |
| WO | WO 00/30727 | 6/2000 |
| WO | WO 02/099760 | 12/2002 |
| WO | WO 2006/076294 | 7/2006 |
| WO | WO 2007/002935 | 1/2007 |
| WO | WO 2007/130443 | 11/2007 |
| WO | WO 2007/130444 | 11/2007 |

* cited by examiner

THE TALL SEVEN SYMBOL SPANNING BETWEEN THE TWO SYMBOL GRIDS OPENED THE GATE FOR SYMBOLS IN THE SECOND COLUMN OF THE TOP GRID TO DROP INTO THE SECOND COLUMN OF THE BOTTOM GRID THE [BAR BAR] [BAR BAR] [BAR BAR] COMBINATION IS ASSOCIATED WITH AN AWARD OF 100

WATCH THE SYMBOLS SHIFT TO POTENTIALLY FORM
EVEN MORE WINNING SYMBOL COMBINATIONS

GAMING SYSTEM AND METHOD FOR PROVIDING A CASCADING SYMBOL GAME WITH MULTIPLE SYMBOL DISPLAY POSITION SYMBOLS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols in a symbol display position matrix or grid. This symbol display position matrix includes a plurality of symbol display positions. Each symbol display position is associated with a specific row and a specific column of the symbol display position matrix. In such a cascading symbol game, the gaming machine evaluates the displayed symbols and provides an award for each winning symbol combination formed. The gaming machine then removes the displayed symbols that form any winning symbol combination to create one or more empty symbol display positions. The gaming machine shifts zero, one, or more of the remaining displayed symbols downward into zero, one, or more of the created empty symbol display positions. If any empty symbol display positions remain, the gaming machine generates and displays a symbol for each remaining empty symbol display position. The gaming machine then evaluates the displayed symbols and provides any award for any winning symbol combinations formed. If winning symbol combinations continue to be formed, the gaming machine repeats the steps of removing generated symbols, shifting generated symbols, generating new symbols, and evaluating generated symbols until no winning symbol combinations remain.

There is a continuing need to increase the level of excitement and entertainment for people playing gaming machines. There is a further need for increasing the number of winning symbol combinations generated and awards provided to a player for a single wager on a play of a game.

SUMMARY

The present disclosure relates generally to gaming systems and methods for providing a cascading symbol game with multiple symbol display position symbols.

In various embodiments, the gaming system disclosed herein includes a cascading symbol or tumbling reel game which utilizes zero, one or more multiple symbol display position symbols. Each multiple symbol display position symbol is configured to occupy or span a plurality of symbol display positions of one or more symbol display position matrices. In certain embodiments, the gaming system triggers one or more features or events based on a generated multiple symbol display position symbol being in the symbol display positions of a plurality of symbol display position matrices. That is, if a generated multiple display position element spans or occupies a plurality of symbol display position matrices, the gaming system triggers one or more features or events which modify one or more aspects of the player's gaming experience. Such a configuration provides an increased level of volatility (and excitement for certain players) by triggering additional features or events based on satisfying an additional condition pertaining to the generation location of one or more multiple symbol display position symbols.

More specifically, in operation of certain embodiments, for a play of a game, the gaming system generates and displays a symbol in each symbol display position of each of a plurality of symbol display position matrices. In these embodiments, each symbol display position matrix includes a plurality of symbol display positions. Following this initial generation, the gaming system evaluates the generated symbols and provides any awards for any generated winning symbols or generated winning symbol combinations.

In addition to providing the player any awards for any winning symbols or winning symbol combinations, the gaming system determines if any multiple symbol display position symbols are generated and displayed at any symbol display positions of a plurality of symbol display position matrices. In these embodiments, since a generated symbol display position symbol is associated with a plurality of symbol display positions, the gaming system determines if such symbol display positions are part of the same or different symbol display position matrices. That is, the gaming system determines if the generated multiple symbol display position symbol spans a plurality of symbol display position matrices. It should be appreciated that the greater the quantity of symbol display positions associated with a generated multiple symbol display position symbol, the greater the probability that the multiple symbol display position symbol spans a plurality of symbol display position matrices.

If the gaming system determines that at least one multiple symbol display position symbol is generated at symbol display positions of a plurality of symbol display position matrices, the gaming system triggers one or more features or events in association with the play of the game. In other words, if a multiple symbol display position matrix spanning event occurs, the gaming system triggers one or more additional features or events which modify one or more aspects of one or more plays of one or more games.

In one example embodiment, if the gaming system determines that any generated multiple symbol display position symbols are generated at symbol display positions of a plurality of symbol display position matrices, the gaming system enables one or more individual symbols to shift from a symbol display position of one symbol display position matrix to a symbol display position of another symbol display position matrix (i.e., the gaming system activates a different symbol display position matrix transfer feature). That is, the gaming system links or otherwise associates at least a first reel, column, row or set of symbol display positions of a first symbol display position matrix with at least a first reel, column, row or set of symbol display positions of a second symbol display position matrix such that if a multiple symbol display position matrix spanning event occurs, the gaming system enables a symbol generated in a symbol display position of one symbol display position matrix to shift to a linked symbol display position of another symbol display position matrix. It should be appreciated that in this embodiment, unless linked or otherwise associated with, zero, one or more reels, columns, rows or sets of symbol display positions of the first symbol display position matrix are not associated with or linked to any reels, columns, rows or sets of symbol display positions in any second symbol display position matrix such that no symbols from any of these reels, columns, rows or sets of symbol display positions of the first symbol display position matrix shift to any reels, columns, rows or sets of symbol display positions of the second symbol display position matrix.

In another example embodiment, if the gaming system determines that any generated multiple symbol display position symbols are generated at symbol display positions of a plurality of symbol display position matrices, the gaming system increases a modifier, such as a multiplier, associated with any determined award for the play of the game. In another example embodiment, if the gaming system determines that any generated multiple symbol display position symbols are generated at symbol display positions of a plurality of symbol display position matrices, the gaming system causes the spanning multiple symbol display position symbol to function as a wild symbol. These embodiments increase the excitement and enjoyment of certain players by activating additional features based on the generation of one or more multiple symbol display position symbols.

In addition to triggering any features or events in association with at least one generated multiple symbol display position symbol being generated at the symbol display positions of a plurality of symbol display position matrices (or if the gaming system determines that no multiple symbol display position symbols are generated at symbol display positions of a plurality of symbol display position matrices), the gaming system determines if any of the displayed symbols should be removed. In one embodiment, this determination includes determining if each of the displayed symbols (including any generated multiple symbol display position symbols) are included in one or more winning symbol combinations.

If the gaming system determines that one or more symbols should be removed, the gaming system removes such symbols to create one or more empty symbol display positions. Following the removal of any generated symbols, the gaming system shifts or repositions zero, one or more of the remaining displayed symbols into zero, one, or more of the created empty symbol display positions. In one such embodiment, if any empty symbol positions are formed in the first reel, column, row or set of symbol display positions of the second symbol display position matrix and the different symbol display position matrix transfer feature is active, the gaming system shifts or transfers one or more symbols from the first reel, column, row or set of symbol display positions of the first symbol display position matrix to the linked first reel, column, row or set of symbol display positions of the second symbol display position matrix to occupy the one or more empty symbol positions. In this embodiment, if any empty symbol positions are formed in the second reel, column, row or set of symbol display positions of the second symbol display position matrix and the different symbol display position matrix transfer feature is active (or the different symbol display position matrix transfer feature is inactive), the gaming system does not shift or transfer any symbols from the second reel, column, row or set of symbol display positions of the first symbol display position matrix to any reel, column, row or set of symbol display positions of the second symbol display position matrix.

Following the shifting or repositioning of zero, one or more symbols, if any empty symbol display positions remain, the gaming system generates and displays a symbol for each remaining empty symbol display position. It should be appreciated that since a multiple symbol display position symbol is associated with a plurality of symbol display positions, following the shifting of zero, one or more symbols, the gaming system generates and displays a multiple symbol display position symbol if a plurality of adjacent symbol display positions are empty. The gaming system repeats this process until no more symbols are to be removed, such as when no more winning symbol combinations are formed. Such a configuration of removing symbols and generating additional symbols provides the player one or more additional award opportunities in association with one play of a game.

Additional features and advantages are described in, and will be apparent from, the following Detailed Description and the figures.

DETAILED DESCRIPTION

Cascading Symbol Game

In various embodiments, the gaming system disclosed herein includes a cascading symbol or tumbling reel game which utilizes zero, one or more multiple symbol display position symbols. Each multiple symbol display position symbol is configured to occupy or span a plurality of symbol display positions of one or more symbol display position matrices. In certain embodiments, the gaming system triggers one or more features or events based on a generated multiple symbol display position symbol being in the symbol display positions of a plurality of symbol display position matrices. That is, if a generated multiple display position element spans or occupies a plurality of symbol display position matrices, the gaming system triggers one or more features or events. Such a configuration provides an increased level of volatility (and excitement for certain players) by providing additional features or events based on satisfying an additional condition pertaining to the generation location of one or more multiple symbol display position symbols.

While certain of the embodiments described below are directed to playing the cascading symbol game as a primary or base game, it should be appreciated that the present disclosure may additionally or alternatively be employed as a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
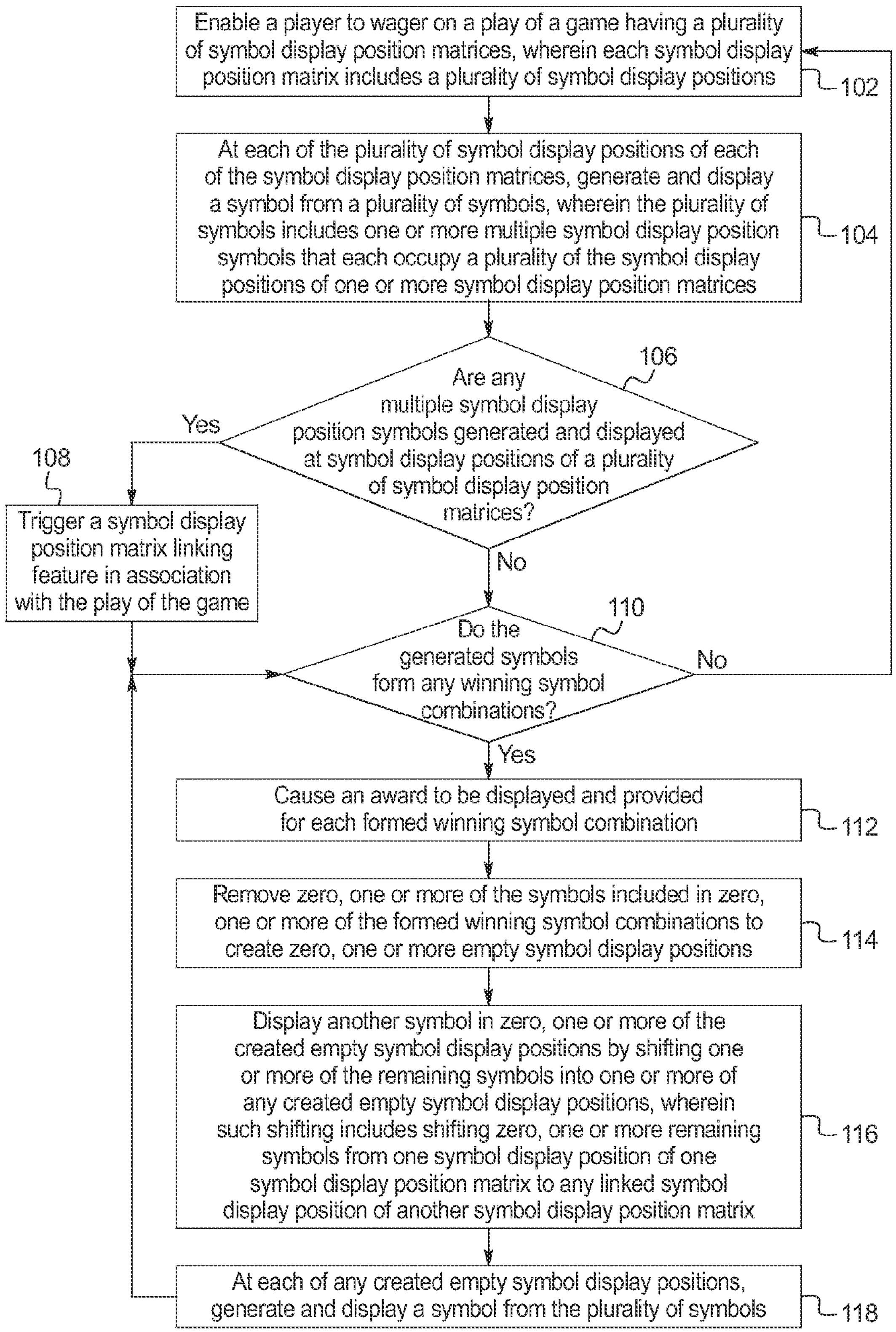
FIG. 1 is a flow chart an example process for operating a gaming system providing one embodiment of a cascading symbol game which employs multiple symbol display position symbols as disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, as indicated in block 102, the gaming system enables a player to wager on a play of a game having a plurality of symbol display position matrices, wherein each symbol display position matrix includes a plurality of symbol display positions.

For the wagered on play of the game, at each of the plurality of symbol display positions of each of the symbol display position matrices, the gaming system generates and displays a symbol from a plurality of symbols as indicated in block 104. The plurality of symbols includes one or more multiple symbol display position symbols, wherein each generated multiple symbol display position symbol includes occupies a plurality of the symbol display positions of one or more symbol display position matrices. Accordingly, in certain embodiments, the gaming system generates and displays a symbol at each symbol display position of each symbol display position matrix wherein zero, one or more symbols (and specifically zero, one or more multiple symbol display position symbols) are simultaneously or concurrently displayed at a plurality of symbol display positions of one or more symbol display position matrices.

In one embodiment, one or more multiple symbol display position symbols are each associated with an individual symbol that, when generated and displayed, spans a plurality of symbol display positions. In another embodiment, one or more multiple symbol display position symbols are each associated with or formed by a plurality of individual symbols that each occupy an individual one of the symbol display positions of one of the symbol display position matrices. In another embodiment, one or more of the multiple symbol display position symbols are formed by linking or otherwise coupling a plurality of individual symbols, such that when displayed, the multiple symbol display position symbol (formed from the plurality of individual symbols) spans, occupies or is otherwise associated with a plurality of the symbol display positions of one or more of the symbol display position matrices.

Figure 2A:
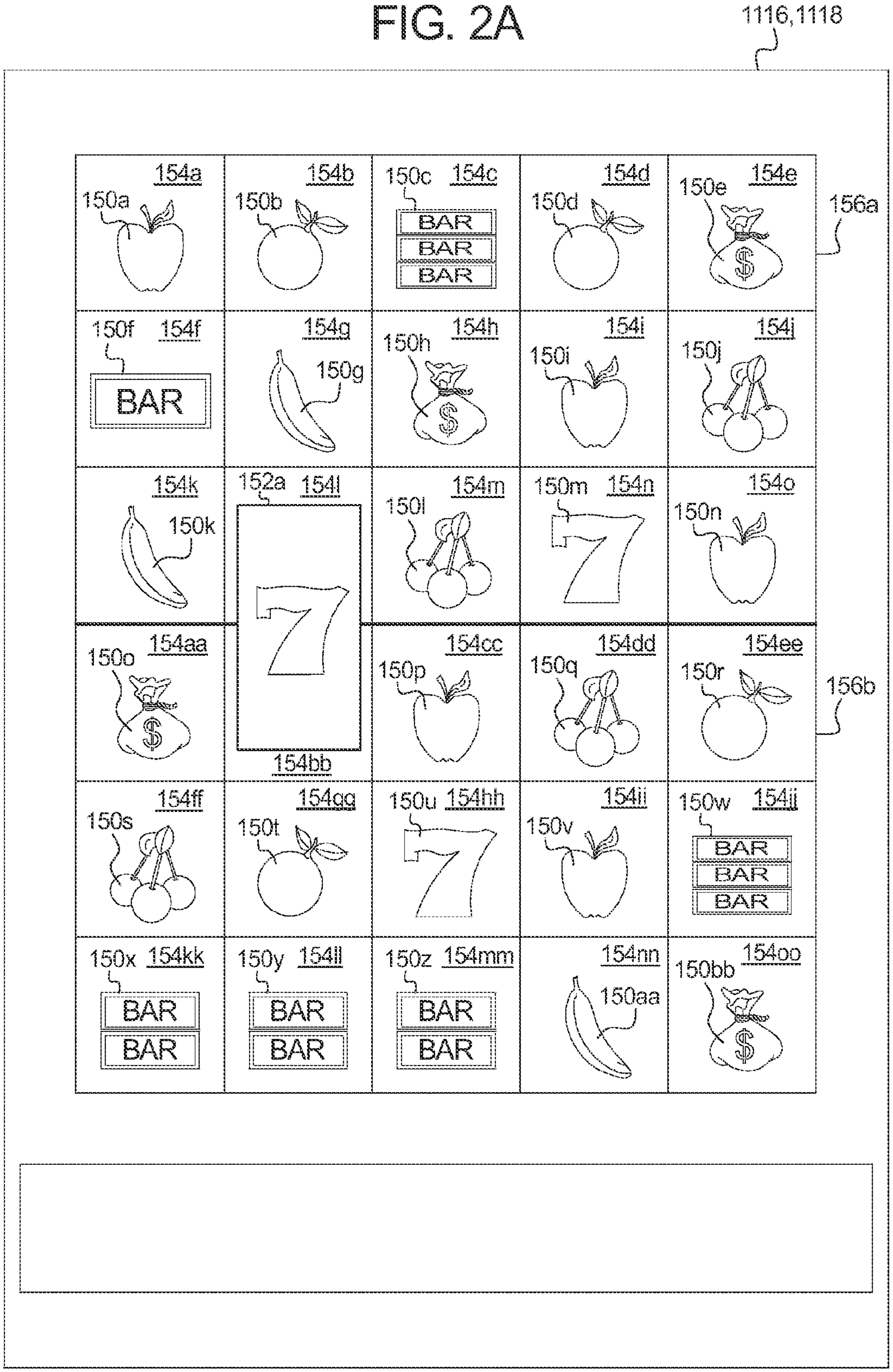
FIGS. 2A, 2B, 2C, 2D and 2E are front views of one embodiment of the gaming system disclosed herein illustrating a play of a cascading symbol game which employs multiple symbol display position symbols.

In one example, as seen in FIG. 2A, for a play of a game, the gaming system generates a plurality of symbols 150 including zero, one or more multiple symbol display position symbols 152 at a plurality of symbol display positions 154 of a plurality of symbol display position matrices or grids 156.

Specifically, as seen in FIG. 2A, the gaming system generated symbols 150*a*, 150*b*, 150*c*, 150*d*, 150*e*, 150*f*, 150*g*, 150*h*, 150*i*, 150*j*, 150*k*, 150*l*, and 150*m* at symbol display positions 154*a*, 154*b*, 154*c*, 154*d*, 154*e*, 154*f*, 154*g*, 154*h*, 154*i*, 154*j*, 154*k*, 154*m*, 154*n*, and 154*o*, respectively, of symbol display position matrix 156*a*. As also seen in FIG. 2A, the gaming system generated symbols 150*n*, 150*o*, 150*p*, 150*q*, 150*r*, 150*s*, 150*t*, 150*u*, 150*v*, 150*w*, 150*x*, 150*y*, 150*z*, 150*aa*, and 150*bb* at symbol display positions 154*aa*, 154*cc*, 154*dd*, 154*ee*, 154*ff*, 154*gg*, 154*hh*, 154*ii*, 154*jj*, 154*kk*, 154*ll*, 154*mm*, 154*nn*, and 154*oo*, respectively, of symbol display position matrix 156*b*. As further seen in FIG. 2A, the gaming system generated multiple symbol display position symbol 152*a* at symbol display position 154*l* of symbol display position matrix 152*a* and at symbol display position 154*bb* of symbol display position matrix 152*b*. In this example, the multiple symbol display position symbol 152*a* is displayed spanning a plurality of symbol display positions.

Following the generation and display of the plurality of symbols (including any multiple symbol display position symbols) at the plurality of symbol display positions of the plurality of symbol display position matrices, the gaming system determines if any multiple symbol display position symbols are generated and displayed at symbol display positions of a plurality of symbol display position matrices as indicated in diamond 106 of FIG. 1. Put differently, since a generated symbol display position symbol is associated with a plurality of symbol display positions, the gaming system determines if such symbol display positions are part of the same or different symbol display position matrices. That is, the gaming system determines if the generated multiple symbol display position symbol spans a plurality of symbol display position matrices.

It should be appreciated that the greater the quantity of symbol display positions associated with a generated multiple symbol display position symbol, the greater the probability that the multiple symbol display position symbol spans a plurality of symbol display position matrices. For example, a multiple symbol display position symbol that occupies three symbol display positions has a greater probability that two of the occupied symbol display positions will be in two different symbol display position matrices than a multiple symbol display position symbol that occupies two symbol display position.

In one embodiment, if the gaming system determines that at least one multiple symbol display position symbol is generated and displayed at symbol display positions of a plurality of symbol display position matrices, the gaming system triggers a symbol display position matrix linking feature in association with the play of the game as indicated in block 108. That is, if a multiple symbol display position matrix spanning event occurs, the gaming system triggers a feature which includes enabling one or more symbols to shift or transfer from one symbol display position matrix to another symbol display position matrix. Accordingly, in this illustrated embodiment, upon the occurrence of a multiple symbol display position matrix spanning event, the gaming system links or otherwise associates one or more symbol display positions of one of the symbol display position matrices to one or more symbol display positions of another one of the symbol display position matrices.

In certain embodiments, the gaming system links OF otherwise associates at least a first reel, column, row or set of symbol display positions of a first symbol display position matrix to at least a first reel, column, row or set of symbol display positions of a second symbol display position matrix. In these embodiments, at least a second reel, column, row or set of symbol display positions of the first symbol display position matrix remains unlinked to or otherwise not associated with any reel, column, row or set of symbol display positions in any second symbol display position matrix.

In certain other embodiments, upon the occurrence of a multiple symbol display position matrix spanning event, the gaming system links reels, columns, rows or sets of symbol display positions of a first symbol display position matrix to the reels, columns, rows or sets of symbol display positions of a second symbol display position matrix, such that each reel, column, row or set of symbol display positions of each symbol display position matrix is linked to another reel, column, row or set of symbol display positions of another symbol display position matrix. In certain embodiments, the gaming system indicates this linking by the alignment of reels, columns, rows or sets of symbol display positions of at least two symbol display position matrices.

Figure 2B:
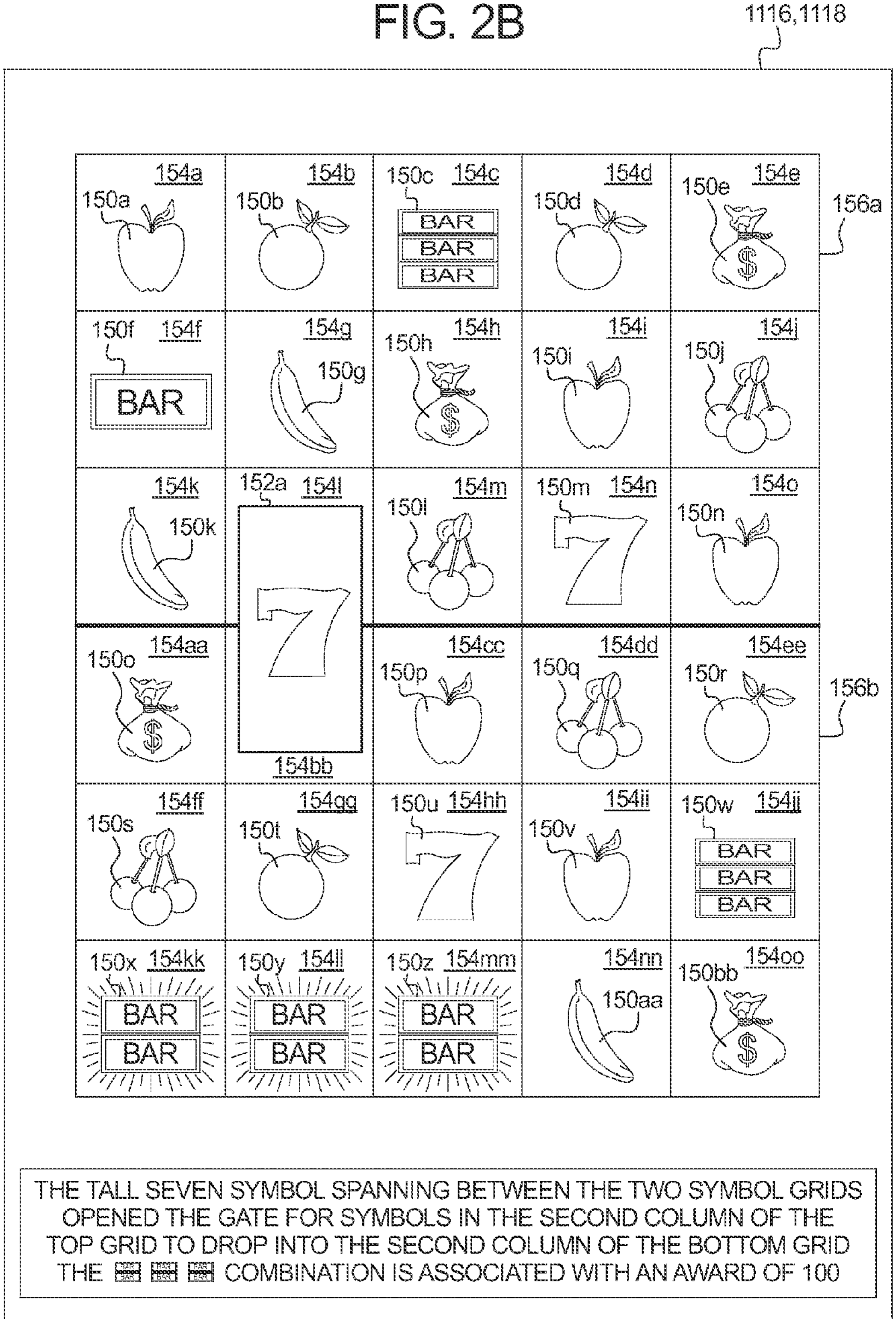

In one embodiment, the gaming system links at least a first reel, column, row or set of symbol display positions of a first symbol display position matrix to at least a first reel, column, row or set of symbol display positions of a second symbol display position matrix based on which symbol display positions the multiple symbol display position symbol is displayed at. For example, as seen in FIG. 2B, since multiple symbol display position symbol 152*a* is generated at symbol display position 154*l* of symbol display position matrix 152*a* and at symbol display position 154*bb* of symbol display position matrix 152*b*, the gaming system triggers the feature of enabling one or more symbols to shift between the second column of symbol display position matrix 152*a* and the second column of symbol display position matrix 152*b*. That is, the gaming system links symbol display positions 154*b*, 154*g* and 154*l* of symbol display position matrix 152*a* to symbol display positions 154*bb*, 154*gg* and 154*ll* of symbol display position matrix 152*b* to enable symbols to transfer between these symbol display positions of these two symbol display position matrices. In this example, the gaming system provides appropriate messages such as "THE TALL SEVEN SYMBOL SPANNING BETWEEN THE TWO SYMBOL GRIDS OPENED THE GATE FOR SYMBOLS IN THE SECOND COLUMN OF THE TOP GRID TO DROP INTO THE SECOND COLUMN OF THE BOTTOM GRID" to the player visually, or through suitable audio or audiovisual displays.

In addition to triggering any features associated with the spanning of any multiple symbol display position symbols (or if the determination is that no multiple symbol display position symbols are generated and displayed at symbol display positions of a plurality of symbol display position matrices), the gaming system determines whether the generated symbols (including any multiple symbol display position symbols) form any winning symbol combinations as indicated in diamond 110 of FIG. 1. It should be appreciated that the gaming system independently evaluates the generated symbols of each symbol display position matrix to determine if such generated symbols form any winning symbol combinations.

If the generated symbols did not form any winning symbol combinations, the gaming system terminates the play of the cascading symbols game and returns to block 102 for another placement of another wager on any play of the cascading symbols game.

On the other hand, if the generated symbols form one or more winning symbol combinations as indicated in block 112, the gaming system causes an award to be displayed and provided for each formed winning symbol combination. As further seen in FIG. 23, upon determining that the symbol combination of double bar symbol 150*x*—double bar symbol 150*y*—double bar symbol 150*z* of symbol display positions 154*kk*, 154*ll* and 154*mm*, respectively, of symbol display position matrix 156*b* is a winning symbol combination, the gaming system provides the player an award of one-hundred credits associated with this winning symbol combination. In this example, the gaming system provides appropriate messages such as "THE DOUBLE BAR—DOUBLE BAR—DOUBLE BAR COMBINATION IS ASSOCIATED WITH AN AWARD OF 100" to the player visually, or through suitable audio or audiovisual displays.

Following providing the player any awards associated with any winning symbol combinations, the gaming system removes zero, one or more of the symbols included in zero, one or more of the formed winning symbol combinations to create zero, one or more empty symbol display positions as indicated in block 114 of FIG. 1.

Figure 2C:
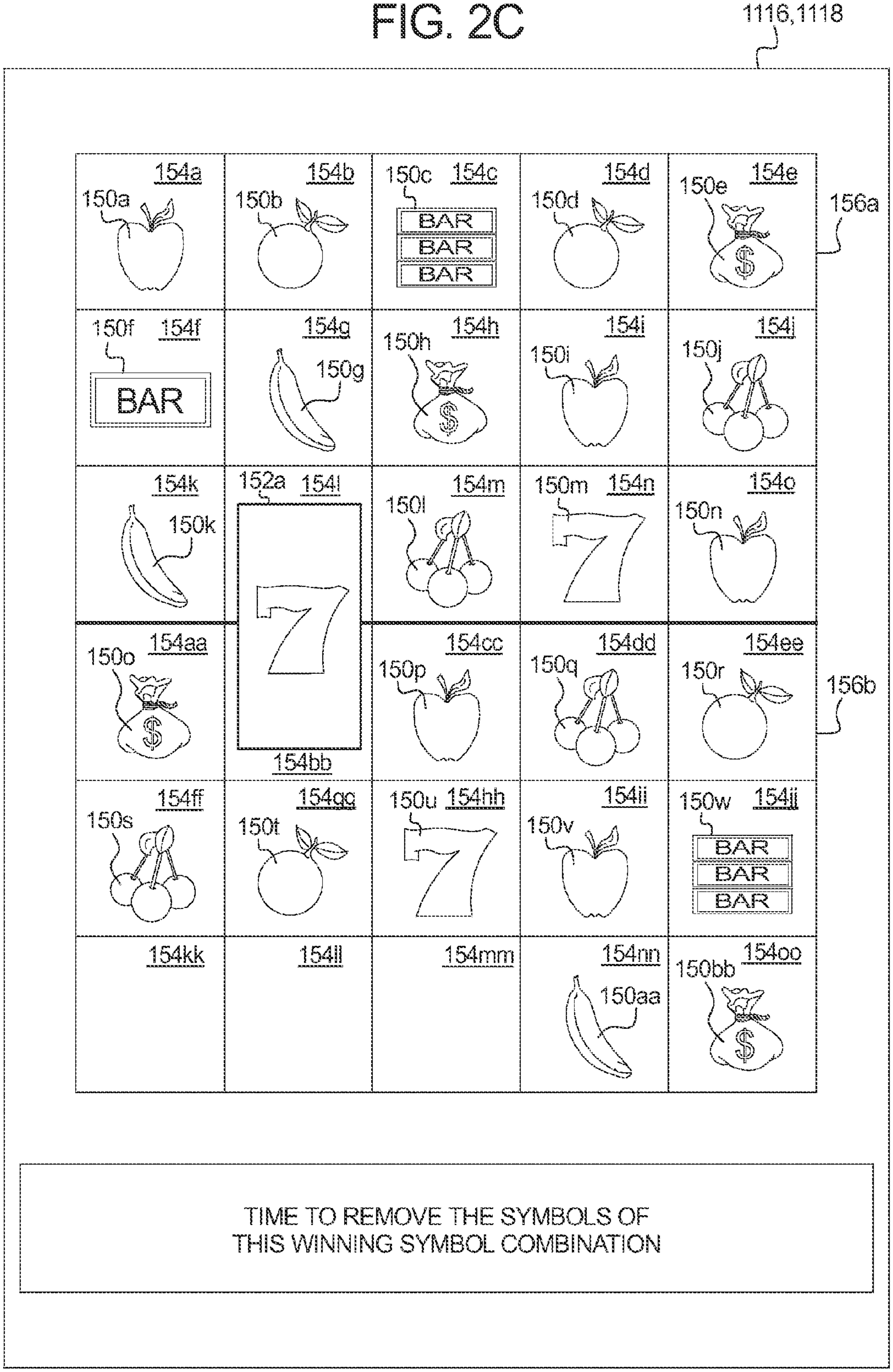

For example, as seen in FIG. 2C, the gaming system removes double bar symbol 150*x*—double bar symbol 150*y*—double bar symbol 150*z* of symbol display positions 154*kk*, 154*ll* and 154*mm*, respectively, of symbol display position matrix 156*b* which form the winning symbol combination. This removal creates empty symbol display positions 154*kk*, 154*ll* and 154*mm*. In this example, the gaming system provides appropriate messages such as "TIME TO REMOVE THE SYMBOLS OF THIS WINNING SYMBOL COMBINATION" to the player visually, or through suitable audio or audiovisual displays.

Following the removal of one or more of the symbols included in one or more of the formed winning symbol combinations, as indicated in block 116 of FIG. 1, the gaming system displays another symbol in zero, one or more of the created empty symbol display positions by shifting one or more of the remaining symbols into one or more of any empty symbol display positions. As further indicated in block 116, such shifting includes shifting zero, one or more remaining symbols from one symbol display position of one symbol display position matrix to any linked symbol display position of another symbol display position matrix.

In one embodiment, for each empty symbol display position of a reel, column, row or set of symbol display positions of a symbol display position matrix that is linked to at least another reel, column, row or set of symbol display positions of another symbol display position matrix, the gaming system shifts or transfers zero, one or more symbols between the linked symbol display position matrices. That is, if two or more reels, columns, rows or sets of symbol display positions of two or more separate symbol display position matrices are linked, the gaming system functions as if the two or more reels, columns, rows or sets of symbol display positions are one reel, column, row or set of symbol display positions of one symbol display position matrix. It should be appreciated that in this embodiment, for each empty symbol display position of a reel, column, row or set of symbol display positions of a symbol display position matrix that is not linked to at least another reel, column, row or set of symbol display positions of another symbol display position matrix, the gaming system does not shift or transfer any symbols between the non-linked symbol display position matrices.

In one embodiment, the gaming system shifts zero, one or more symbols (including zero, one or more multiple symbol display position symbols) into zero, one or more of the created empty symbol display positions according to applicable game rules. For example, under one set of applicable game rules wherein symbols are shifted downward to fill empty symbol display positions, if a winning symbol combination results in a displayed empty symbol display position along a bottom row of symbol display positions, the gaming system will shift at least one symbol in a symbol display position above the empty symbol display position downward to fill the empty symbol display position. In this example, under these applicable set of game rules, if a winning symbol combination results in a displayed empty symbol display position along a top row of symbol display positions, the gaming system will not shift any symbols to fill the empty symbol display position. It should be appreciated that since each multiple symbol display position symbol occupies a plurality of symbol display positions, the gaming system shifts each multiple symbol display position symbol into a plurality of empty symbol display positions. It should be further appreciated that in different embodiments, zero, one or more multiple symbol display position symbols are shifted in a direction based on the different symbols generated at the symbol display positions of the different symbol display position matrices. That is, a multiple symbol display position symbol may shift in different directions based on the symbols generated in the different symbol display position matrices.

In one embodiment, the gaming system shifts any remaining symbols as many symbol display positions as possible in a designated direction, while maintaining the position of each shifted symbol relative to one or more other symbols or coordinates. For instance, the gaming system in one embodiment moves each symbol positioned in a symbol display position adjacently above an empty symbol display position of a column of a symbol display position matrix (displayed as a reel) downward as far as possible to occupy one or more empty symbol display positions while maintaining the relative order of the symbols of that column of the symbol display position matrix from top to bottom. In this embodiment, shifting the non-removed symbols does not result in fewer empty symbol display positions. Rather, shifting the non-removed symbols results in a plurality of different empty symbol display positions wherein each empty symbol display position has a given relationship to any remaining symbols, the relationship based on the direction of shifting. It should be appreciated that in various embodiments, shifting symbols downward (or upward, or sideways or diagonally or any suitable direction) to fill one or more empty symbol display positions causes a cascading, tumbling, or falling appearance of the symbols in the gaming system, which increases player excitement and enjoyment.

Figure 2D:
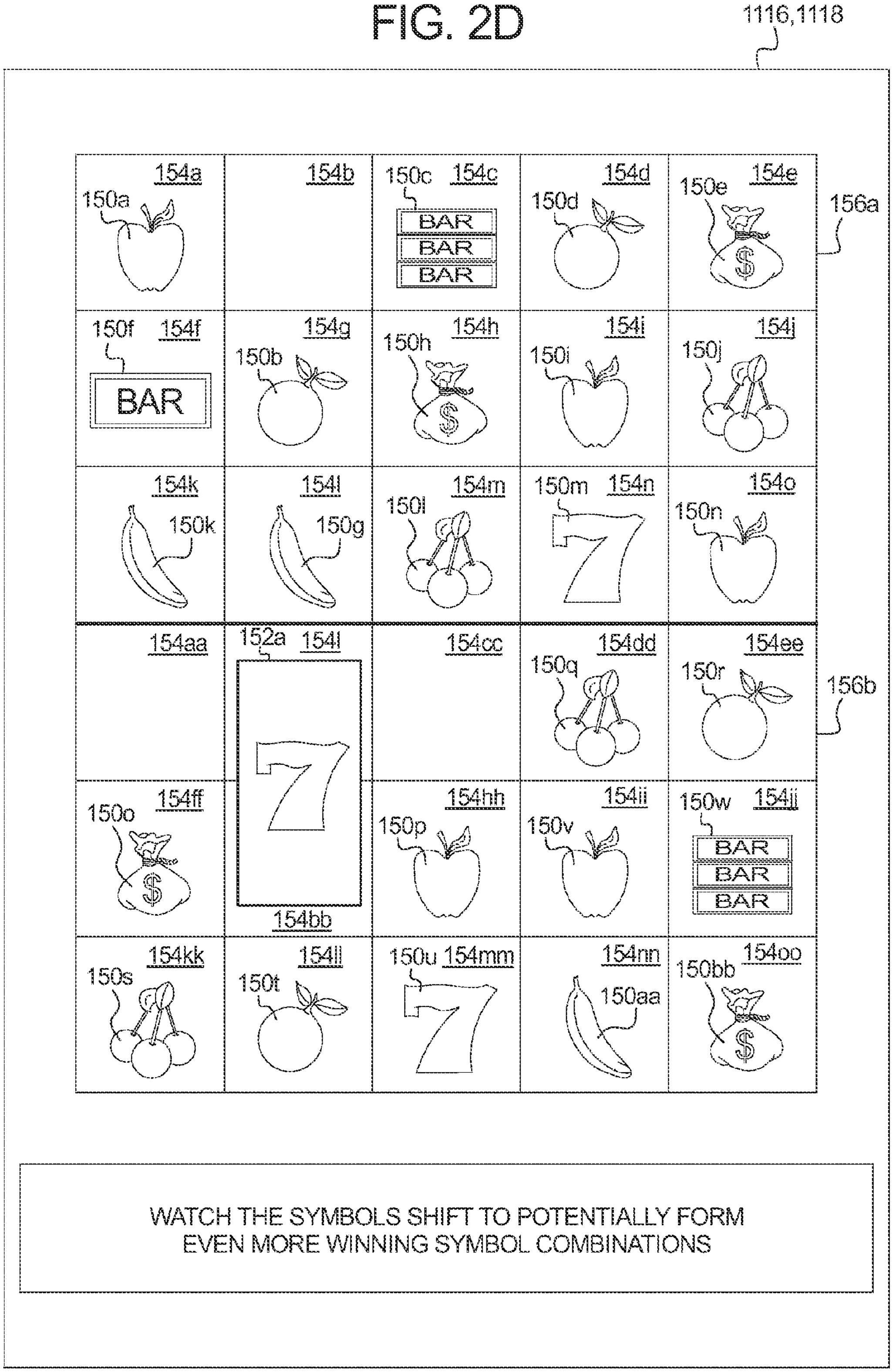

For example, as seen in FIG. 2D, following the creation of empty symbol display positions 154*kk*, 154*ll* and 154*mm*, the gaming system shifts: (i) cherry symbol 150*s*, orange symbol 150*t* and seven symbol 150*u* into symbol display positions 154*kk*, 154*ll* and 154*mm*, respectively, of the third or bottom row of symbol display position matrix 156*b*, (ii) money bag symbol 150*o* and apple symbol 150*p* into symbol display positions 154*ff*, and 154*hh*, respectively, of the second or middle row of symbol display position matrix 156*b*, (iii) banana symbol 150*g* into symbol display position 154*l* of the third or bottom row of symbol display position matrix 156*a*, (iv) orange symbol 150*b* into symbol display position 154*g* of the second or middle row of symbol display position matrix 156*a*, and (v) multiple symbol display position symbol 152*a* into symbol display positions 154*bb* and 154*gg* of the top and middle rows of symbol display position matrix 156*b*. Such shifting creates empty symbol display position 154*b* in symbol display position matrix 156*a* and empty symbol display positions 154*aa* and 154*cc* in symbol display position matrix 156. In this example, the gaming system provides appropriate messages such as "WATCH THE SYMBOLS SHIFT TO POTENTIALLY FORM EVEN MORE WINNING SYMBOL COMBINATIONS" to the player visually, or through suitable audio or audiovisual displays.

As seen in this example, since the second column of each of symbol display position matrices 156*a* and 156*b* were previously linked (based on the generation of multiple symbol display position symbol 152*a* being in both symbol display position matrices 156*a* and 156*b*), the gaming system transferred or repositioned symbols from symbol display position matrix 156*a* to symbol display position matrix 156*b*. That is, for the linked columns, the gaming system shifted one or more symbols between these two symbol display position matrices as if these two symbol display position matrices were a single symbol display position matrix.

As further seen in this example, since the remaining columns of each of symbol display position matrices 156*a* and 156*b* were not previously linked, the gaming system did not transfer or reposition symbols from symbol display position matrix 156*a* to symbol display position matrix 156*b* for the non-linked columns. That is, for the unlinked columns, the gaming system did not shift any symbols between these two symbol display position matrices and continued to maintain these two symbol display position matrices as separate and distinct symbol display position matrices.

After shifting zero, one or more symbols to create zero, one or more different empty symbol display positions, the gaming system generates and displays a symbol from the plurality of symbols at each of any empty symbol display positions as indicated in block 118 of FIG. 1.

Following the display of a symbol in each of the created empty symbol display positions, the gaming system then returns to diamond 110 and proceeds with determining if any multiple symbol display position symbols are generated and displayed at symbol display positions of a plurality of symbol display position matrices.

Figure 2E:
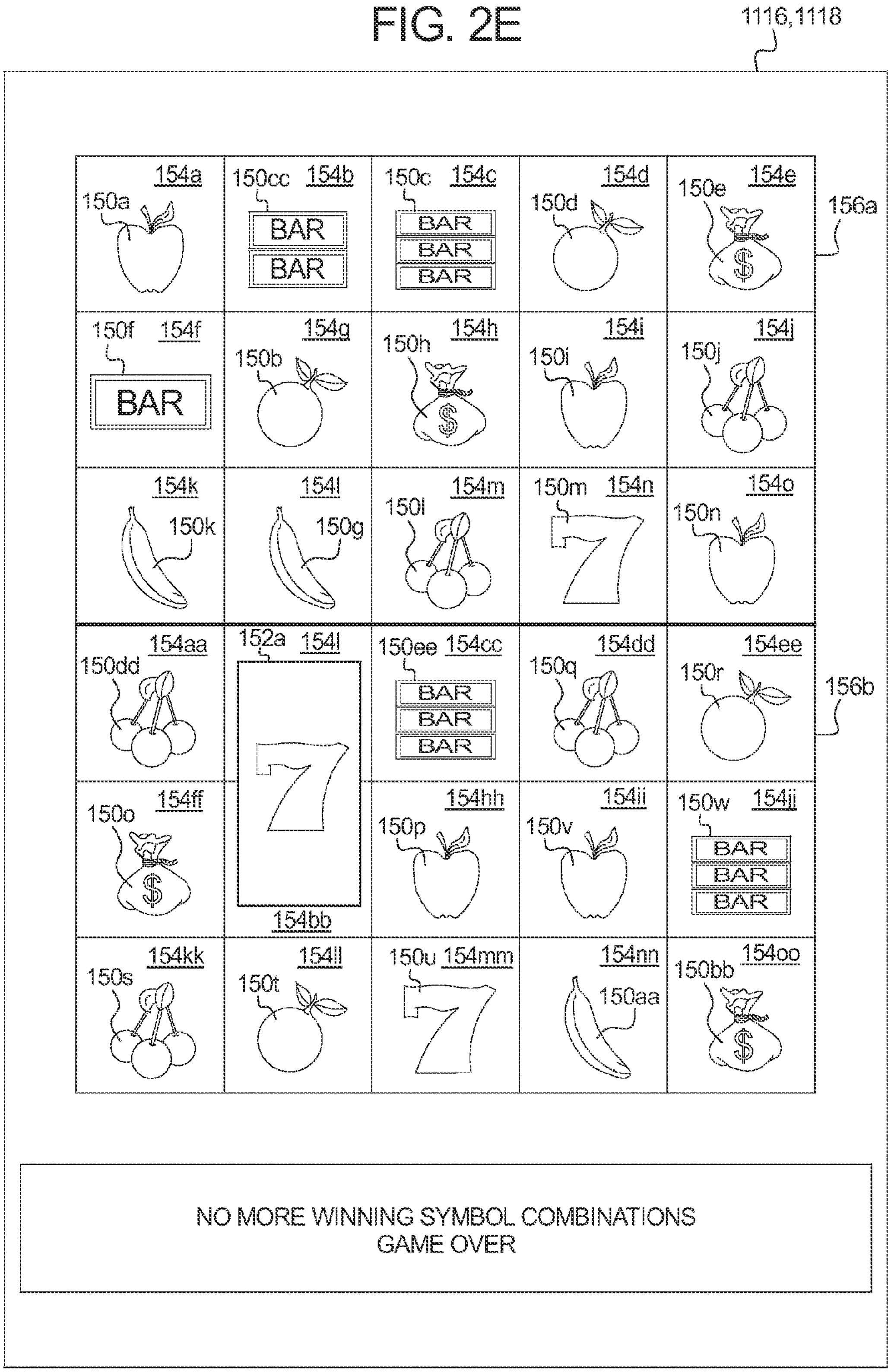

Continuing with the above example, as seen in FIG. 2E, following the shifting of a plurality of the remaining symbols, the gaming system generates: (i) double bar symbol 150*cc* at symbol display position 154*b* of symbol display position matrix 156*a*, cherry symbol 150*dd* at symbol display position 154*aa* of symbol display position matrix 156*b* and (iii) triple bar symbol 150*ee* at symbol display position 154*cc* of symbol display position matrix 156*a*. After determining that no multiple symbol display position symbols are generated and displayed at symbol display positions of a plurality of symbol display position matrices and determining that none of the currently generated symbols form any winning symbol combinations associated with any awards, the gaming system terminates the play of the cascading symbols game and awaits another placement of another wager. In this example, the gaming system provides appropriate messages such as "NO MORE WINNING SYMBOL COMBINATIONS" and "GAME OVER" to the player visually, or through suitable audio or audiovisual displays.

In one embodiment, as described above, if the gaming system determines that any generated multiple symbol display position symbols are generated at symbol display positions of a plurality of symbol display position matrices, the gaming system enables one or more individual symbols to shift from a symbol display position of one symbol display position matrix to a symbol display position of another symbol display position matrix (i.e., the gaming system activates a different symbol display position matrix transfer feature). In another embodiment, one or more multiple symbol display position symbols are wild symbols wherein if the gaming system determines that any generated multiple symbol display position symbols are generated at symbol display positions of a plurality of symbol display position matrices, the gaming system increases a modifier, such as a multiplier, associated with that wild symbol. For example, if a multiple symbol display position symbol is generated in symbol display positions of one symbol display position matrix, the gaming system associates that multiple symbol display position symbol with a multiplier of 1×. In this example, if the multiple symbol display position symbol is generated in symbol display positions of two symbol display position matrices, the gaming system associates that multiple symbol display position symbol with a multiplier of 2×.

In another embodiment, one or more multiple symbol display position symbols are wild symbols wherein if the gaming system determines that any generated multiple symbol display position symbols are generated at symbol display positions of a plurality of symbol display position matrices, the gaming system modifies a modifier, such as a multiplier, associated with that wild symbol. For example, if a multiple symbol display position symbol is generated in symbol display positions of one symbol display position matrix, the gaming system associates that multiple symbol display position symbol with a multiplier of 2×. In this example, if the multiple symbol display position symbol is generated in symbol display positions of two symbol display position matrices, the gaming system randomly associates that multiple symbol display position symbol with a multiplier of either 1× or 4×.

In another embodiment, if the gaming system determines that any generated multiple symbol display position symbols are generated at symbol display positions of a plurality of symbol display position matrices, the gaming system causes the spanning multiple symbol display position symbol to function as a wild symbol. In another embodiment, if the gaming system determines that any generated multiple symbol display position symbols are generated at symbol display positions of a plurality of symbol display position matrices, the gaming system increases a modifier, such as a multiplier, associated with any determined award for the play of the game.

In one embodiment, if the gaming system determines that at least one multiple symbol display position symbol is generated and displayed at symbol display positions of a plurality of symbol display position matrices (i.e., a multiple symbol display position matrix spanning event occurred), the gaming system links at least a first reel, column, row or set of symbol display positions of a first symbol display position matrix to at least a first reel, column, row or set of symbol display positions of a second symbol display position matrix. In another embodiment, if the gaming system determines that a designated quantity of multiple symbol display position symbols are generated and displayed at symbol display positions of a plurality of symbol display position matrices (i.e., a multiple symbol display position matrix spanning event occurred), the gaming system links at least a first reel, column, row or set of symbol display positions of a first symbol display position matrix to at least a first reel, column, row or set of symbol display positions of a second symbol display position matrix. In another embodiment, if the gaming system determines that a designated quantity of multiple symbol display position symbols are generated and displayed at symbol display positions of a plurality of symbol display position matrices (i.e., a multiple symbol display position matrix spanning event occurred), the gaming system links reels, columns, rows or sets of symbol display positions of a first symbol display position matrix to the reels, columns, rows or sets of symbol display positions of a second symbol display position matrix, such that each reel, column, row or set of symbol display positions of each symbol display position matrix is linked to another reel, column, row or set of symbol display positions of another symbol display position matrix.

In one embodiment, if a generated multiple symbol display position symbol is part of a winning symbol combination, the gaming system removes the generated multiple symbol display position symbol. In another embodiment, if a generated multiple symbol display position symbol is part of a winning symbol combination, the gaming system removes the portion of the generated multiple symbol display position symbol that was part of the winning symbol combination, wherein another portion of the generated multiple symbol display position symbol (i.e., the part of the generated multiple symbol display position symbol not part of a winning symbol combination) remains.

In another embodiment, if a generated multiple symbol display position symbol is part of a winning symbol combination, the gaming system modifies the portion of the generated multiple symbol display position symbol that was part of the winning symbol combination. For example, the gaming system increases a modifier, such as a multiplier, associated with the portion of the generated multiple symbol display position symbol that was part of the winning symbol combination. In another example, the gaming system causes the portion of the generated multiple symbol display position symbol that was part of the winning symbol combination to function as a wild symbol. In another embodiment, the gaming system removes a generated multiple symbol display position symbol if each part of the generated multiple symbol display position symbol is part of one or more winning symbol combinations.

In another embodiment, if the gaming system generates a multiple symbol display position symbol, the gaming system locks or holds the multiple symbol display position symbol at the plurality of symbol display positions for one or more plays of the game. In one such embodiment, the gaming system modifies the multiple symbol display position symbol from game to game (or within a play of a game). In different embodiments, the gaming system changes the size and/or shape of the multiple symbol display position symbol. In one embodiment, the changed size and/or shape of the multiple symbol display position symbol is based on one or more created empty symbol display positions. In this embodiment, the gaming system increases or decreases the size (or changes the shape) of the multiple symbol display position symbol to occupy any empty symbol display positions. In one embodiment, the changed size and/or shape of the multiple symbol display position symbol is based on one or more other symbols generated.

In another embodiment, if the gaming system determines that any generated multiple symbol display position symbols are generated at symbol display positions of a plurality of symbol display position matrices, the gaming system triggers an unlocking of or a modification to one or more attributes or features of the play of the game and/or one or more attributes or features of one or more triggered secondary or bonus games. In different embodiments, the gaming system selects such attribute(s) or feature(s) from the group of features including, but not limited to:

i. a book-end wild symbols feature;
ii. a stacked wild symbols feature;
iii. an expanding wild symbols feature;
iv. a wild reel feature;
v. a retrigger symbol feature;
vi. an anti-terminator symbol feature;
vii. a locking reel feature,
viii. a locking symbol position feature;
ix. a modification of a paytable utilized for a play of a game;
x. an application of a modifier, such as a multiplier or an additional quantity of credits, to one or more awards of a paytable utilized for a play of a game,
xi. a modification of an average expected payback percentage of a play of a game;
xii. a modification of an average expected payout of a play of a game;
xiii. a modification of one or more awards available;
xiv. a modification of a range of awards available;
xv. a modification of a type of awards available;

xvi. a modification of one or more progressive awards;
xvii. a modification of which progressive awards are available to be won;
xviii. a modification of one or more modifiers, such as multipliers, available;
xix. a modification of an activation of a reel (or a designated reel);
xx. a modification of an activation of a plurality of reels;
xxi. a modification of a generated outcome (or a designated generated outcome);
xxii. a modification of a generated outcome (or a designated generated outcome) associated with an award over a designated value;
xxiii. a modification of a generated outcome (or a designated generated outcome) on a designated payline;
xxiv. a modification of a generated outcome (or a designated generated outcome) in a scatter configuration;
xxv. a modification of a winning way to win (or a designated winning way to win);
xxvi. a modification of a designated symbol or symbol combination;
xxvii. a modification of a generation of a designated symbol or symbol combination on a designated payline;
xxviii. a modification of a generation of a designated symbol or symbol combination in a scatter configuration;
xxix. a modification of an activation of a secondary or bonus display (such as an award generator);
xxx. a modification of a quantity of activations of a secondary or bonus display (e.g., a modification of a quantity of spins of an award generator);
xxxi. a modification of a quantity of sections of a secondary or bonus display (e.g., a modification of a quantity of sections of an award generator);
xxxii. a modification of one or more awards of a secondary or bonus display;
xxxiii. a modification of an activation of a community award generator;
xxxiv. a modification of a quantity of activations of a community award generator;
xxxv. a modification of a quantity of sections of a community award generator;
xxxvi. a modification of one or more awards of a community award generator;
xxxvii, a modification of a quantity of picks in a selection game;
xxxviii. a modification of a quantity of offers in an offer and acceptance game;
xxxix. a modification of a quantity of moves in a trail game;
xl. a modification of an amount of free spins provided;
xli. a modification of a game terminating or ending condition;
xlii. a modification of how one or more aspects of one or more games (e.g., colors, speeds, sound) are displayed to a player; and
xliii. a modification of any game play feature associated with any play of any game disclosed herein.

In one embodiment, if an attribute or feature is triggered or activated, that attribute or feature remains active for the duration of the play of the game (and/or for one or more subsequent plays of the game). In another embodiment, if an attribute or feature is triggered or activated, that attribute or feature remains active until no more multiple symbol display position symbols are displayed at the symbol display positions of a plurality of symbol display position matrices. In another embodiment, if an attribute or feature is triggered or activated, a determination of if that attribute or feature remains active or not is based on the locations of the symbol display positions that one or more multiple symbol display position symbols are displayed at.

In certain embodiments, as described above, if the gaming system determines that any generated multiple symbol display position symbols are generated at symbol display positions of a plurality of symbol display position matrices, the gaming system triggers a modification to one or more attributes or features of one or more triggered secondary or bonus games. In different embodiments, the gaming system selects a secondary or bonus game to play from the group of secondary games including; but not limited to:

i. a play of any suitable slot game;
ii. a play of any suitable free spins or free game activations;
iii. a play of any suitable wheel game;
iv. a play of any suitable card game;
v. a play of any suitable offer and acceptance game;
vi. a play of any suitable award ladder game;
vii. a play of any suitable puzzle-type game;
viii. a play of any suitable persistence game;
ix. a play of any suitable selection game;
x. a play of any suitable cascading symbols game;
xi. a play of any suitable ways to win game;
xii. a play of any suitable scatter pay game;
xiii. a play of any suitable coin-pusher game;
xiv. a play of any suitable elimination game;
xv. a play of any suitable stacked wilds game;
xvi. a play of any suitable trail game;
xvii. a play of any suitable bingo game;
xviii. a play of any suitable video scratch-off game;
xix. a play of any suitable pick-until-complete game;
xx. a play of any suitable shooting simulation game;
xxi. a play of any suitable racing game;
xxii. a play of any suitable promotional game;
xxiii. a play of any suitable high-low game;
xxiv. a play of any suitable lottery game;
xxv. a play of any suitable number selection game;
xxvi. a play of any suitable dice game;
xxvii. a play of any suitable skill game;
xxviii. a play of any suitable auction game;
xxix. a play of any suitable reverse-auction game;
xxx. a play of any suitable group game;
xxxi. a play of any suitable game in a service window;
xxxii. a play of any suitable game on a mobile device; and/or
xxxiii. a play of any other suitable type of game.

In one embodiment, one or more multiple symbol display position symbols are wild symbols. In different embodiments, for each generation, removal and/or shifting associated with that wild symbol, the gaming system accumulates one or more modifiers, such as multipliers, for the player. In another embodiment, one or more multiple symbol display position symbols are modifier symbols, such as multipliers. In different embodiments, for each generation, removal and/or shifting associated with that modifier symbol, the gaming system modifies a value of that modifier symbol. In another embodiment, one or more multiple symbol display position symbols are wild modifier symbols, such as wild multipliers. In different embodiments, for each generation, removal and/or shifting associated with that wild modifier symbol, the gaming system modifies a value of that wild modifier symbol.

In another embodiment which either employs one symbol display position matrix or employs a plurality of symbol display position matrices, zero, one or more multiple symbol display position symbols are partially in a symbol display position matrix and partially out of the symbol display position matrix. In this embodiment, the triggering of one or more features or events disclosed herein is based on the multiple symbol display position symbols being displayed at the symbol display positions of one or more symbol display position matrices. For example, if a multiple symbol display position symbol is generated in the top row of a symbol display position matrix (such that part of the multiple symbol display position symbol is displayed to the player and part of the multiple symbol display position symbol is not displayed), the gaming system determines a modifier to associate with that multiple symbol display position symbol based on how much of that multiple symbol display position symbol is displayed. In this example, a fully displayed multiple symbol display position symbol is associated with a modifier of 2× while a partially displayed multiple symbol display position symbol is associated with a modifier of 1×. In another example, a partially displayed multiple symbol display position symbol triggers the display of another one or more symbol display positions (i.e., a partial multiple symbol display position symbol causes the expansion of one or more reels to display one or more additional rows).

In another embodiment, one or more multiple symbol display position symbols are associated with an indicated quantity, such as a numeral indicated in parentheses next to that multiple symbol display position symbol. In one embodiment, each time that multiple symbol display position symbol is shifted, the indicated quantity of that multiple symbol display position symbol is modified. If the modified quantity of the multiple symbol display position symbol is less than a predefined quantity, then no additional features are triggered in association with that multiple symbol display position symbol. On the other hand, if the modified quantity is greater than the predefined quantity, one or more additional features are triggered in association with that multiple symbol display position symbol. In another embodiment, each time a multiple symbol display position symbol is included in a winning symbol combination (i.e., a removal qualification condition is satisfied for that multiple symbol display position symbol), the indicated quantity of that multiple symbol display position symbol is modified. If the modified quantity is greater than a predefined quantity, such as zero, that multiple symbol display position symbol remains. On the other hand, if the modified quantity of the multiple symbol display position symbol is equal to or less than the predefined quantity, then that multiple symbol display position symbol is removed as described above. It should be appreciated that the utilization of indicated quantities of such multiple symbol display position symbol operates similar to the utilization of the wild symbols useable for a designated quantity of symbol generations as described in U.S. Published Patent Application No. 2010/0022297.

In one embodiment, as described above, the gaming system causes zero, one or more symbols (including one or more multiple symbol display position symbols) to tumble and/or shift downward (or upward, or sideways or diagonally or any suitable direction) to fill one or more empty symbol display positions. In another embodiment, the gaming system utilizes different directions of movement for different symbol movements in association with a play of the cascading symbols game. In one such embodiment, the gaming system causes the initial generation of any symbols (including any multiple symbol display position symbols) to shift downwards wherein if any empty symbol display positions are subsequently created, the gaming system causes zero, one or more remaining symbols (including or excluding multiple symbol display position symbols) to shift sideways.

In one embodiment, the gaming system determines a shifting direction based on which symbol display position matrix includes one or more empty symbol display positions and based on if such an empty symbol display position is linked to any other symbol display positions of any other symbol display position matrices. For example, if a bottom or lower symbol display position matrix includes an empty symbol display position and that symbol display position is linked to another symbol display position of a top or upper symbol display position matrix, the gaming system determines a downward shifting direction. In this example, if the bottom or lower symbol display position matrix includes an empty symbol display position and that symbol display position is not linked to another symbol display position of a top or upper symbol display position matrix, the gaming system determines an upward shifting direction (i.e., if symbol display positions are not linked, the gaming system determines an upward shifting direction for the bottom symbol display position matrix and a downward shifting direction for the top symbol display position matrix).

In another embodiment, the gaming system enables a player to designate one or more of the symbols (including or excluding one or more multiple symbol display position symbols) to hold wherein the gaming system removes any non-player designated symbols in association with the next shifting of symbols. In this embodiment, the gaming system enables a player to hold one or more symbols (including or excluding one or more multiple symbol display position symbols) wherein one or more non-held symbols are subsequently removed from the symbol display position grid. In one such embodiment, the gaming system implements this feature based on the placement of a wager, such as a side wager or a maximum wager.

In another embodiment which includes one or more player inputs, the gaming system enables a player to designate one or more symbols (including or excluding one or more multiple symbol display position symbols) wherein the gaming system removes any player designated symbols in association with the next shifting of symbols. In this embodiment, the gaming system enables a player to discard one or more symbols (including or excluding one or more multiple symbol display position symbols) wherein one or more non-discarded symbols are held at one or more symbol display positions within one or more symbol display position grids. In one such embodiment, the gaming system implements this feature based on the placement of a wager, such as a side wager or a maximum wager.

In another embodiment, the gaming system disclosed herein utilizes the fourth dimension of time to determine any awards to be provided to a player. In one such embodiment, the gaming system associates certain multiple symbol display position symbols with a duration until such multiple symbol display position symbols shift symbol display positions. In another such embodiment, the gaming system associates certain multiple symbol display position symbols with a duration which those symbols remain in a symbol display position grid. In this embodiment, if a multiple symbol display position symbol is generated in a plurality of symbol display positions and a removal qualification condition is satisfied in association with that multiple symbol display position symbol (e.g., the multiple symbol display position symbol form part of a winning symbol combination), then as long as the associated duration has not expired, the multiple symbol display position symbol is not removed from the symbol display positions of the symbol display position grid. In one such embodiment, if a multiple symbol display position symbol remain in a symbol display position grid for a designated duration, the gaming system triggers one or more secondary games.

In another embodiment, one or more multiple symbol display position symbols are associated with an award, such as a value, a modifier (e.g., a multiplier) or a quantity of free spins. In one such embodiment, the gaming system provides an award to a player based on the awards associated with the displayed generated multiple symbol display position symbols. In another such embodiment, the gaming system provides an award to a player based on the awards associated with the displayed multiple symbol display position symbols included in a winning symbol combination. In another such embodiment, if a secondary game triggering event occurs, the gaming system triggers a play of a secondary game with one or more features of the secondary game are based on the awards associated with the displayed multiple symbol display position symbols.

In another embodiment, one or more multiple symbol display position symbols are associated with a positive outcome and one or more multiple symbol display position symbols are associated with a negative outcome. In this embodiment, which may be employed in association with a tumbling symbol game (as described above) or in association with a non-tumbling symbol genie, the gaming system determines any awards to provide based on the quantity and type of multiple symbol display position symbols associated with positive outcomes compared to the quantity and type of multiple symbol display position symbols associated with negative outcomes. In one such embodiment, one or more outcomes associated with one or more multiple symbol display position symbols are associated with an attribute, such as a relative weighting of that outcome.

In another embodiment, each symbol display position grid has a different depth. Thus, each symbol display position of each symbol display position grid is associated with a specific row, a specific column and a specific depth. Moreover, in each symbol display position grid of this embodiment, one or more symbol display positions are aligned with or otherwise correspond with one or more symbol display positions of one or more symbol display position grids of different depths. That is, one or more symbol display position grids are positioned (relative to the player's line of sight) behind one or more other symbol display position grids and thus one or more symbol display positions of one or more symbol display position grids are positioned (relative to the player's line of sight) behind one or more symbol display positions of one or more other symbol display position grids. It should be appreciated that in one embodiment which utilizes a plurality of symbol display position grids, the creation of one or more empty symbol display positions at one symbol display position grid causes the exposure of symbols generated at symbol display positions of another grid positioned at another depth.

In one embodiment, one or more of the generated symbols and/or one or more of the generated multiple symbol display position symbols include a length component and a width component, such as a two dimensional tile with a symbol displayed on the face of the tile. In one such embodiment which employs a single symbol display position grid, the gaming system generates and displays a symbol and/or a multiple symbol display position symbol in each of the plurality of symbol display positions of the single symbol display position grid. In another such embodiment which employs a plurality of symbol display position grids of different depths, the gaming system generates and displays a symbol and/or a multiple symbol display position symbol in each of the plurality of symbol display positions of each of the plurality of symbol display position grids.

In another embodiment, one or more of the generated symbols are multiple dimension symbols including a length component, a width component and a depth component. In another embodiment, one or more of the generated multiple symbol display position symbols are additionally or alternatively multiple dimension multiple symbol display position symbols including a length component, a width component and a depth component. For example, one or more multiple dimension symbols and/or one or more multiple symbol display position symbols each include a six-sided or hexagonal shape with individually displayed symbols on each side or face of the multi-dimensional shape. In another example, one or more multiple dimension symbols and/or one or more multiple symbol display position symbols each include a four-sided square or rectangular shape with individually displayed symbols on each side or face. In another example, one or more multiple dimension symbols and/or one or more multiple symbol display position symbols each include a three-sided or triangular shape with individually displayed symbols on each side or face. In an alternative embodiment, one or more faces or sides of one or more multiple dimension symbols and/or multiple symbol display position symbols do not include an individually displayed symbol. It should be appreciated that such multiple dimension symbols can include any suitable number of sides and any suitable number of individually displayed symbols per side.

In one such embodiment which employs a single symbol display position grid, multiple dimension symbols and multiple dimension multiple symbol display position symbols, the gaming system generates and displays a multiple dimension symbol and/or a multiple symbol display position symbol in the plurality of symbol display positions of the single symbol display position grid. In another such embodiment which employs a plurality of symbol display position grids of different depths, multiple dimension symbols and multiple dimension multiple symbol display position symbols, the gaming system generates and displays a multiple dimension symbol and/or a multiple symbol display position symbol in the plurality of symbol display positions of each of the plurality of symbol display position grids. In certain embodiments, the gaming system generates a multiple symbol display position symbol at multiple symbol display position matrices having different depths.

In the embodiments which include a plurality of symbol display position grids, a plurality of multiple dimension symbols and/or a plurality of multiple dimension multiple symbol display position symbols, one or more paylines of any suitable direction extend through a plurality of symbol display positions, one or more symbols displayed on one or more faces of one or more multiple dimension symbols and/or one or more multiple symbol display position symbols of a symbol display position grid at one depth. In another embodiment, one or more paylines of any suitable direction extend through a plurality of symbol display positions, one or more symbols displayed on one or more faces of one or more multiple dimension symbols and/or one or more multiple symbol display position symbols of a plurality of symbol display position grids at a plurality of different depths. In these embodiments, the gaming system determines whether the symbols generated along such paylines form any winning symbol combinations. In another embodiment, one or more ways to win are associated with a plurality of symbol display positions, one or more symbols displayed on one or more faces of one or more multiple dimension symbols and/or one or more multiple symbol display position symbols of one or more symbol display position grids at one depth. In another embodiment, one or more ways to win are associated with a plurality of symbol display positions, one or more symbols displayed on one or more faces of one or more multiple dimension symbols and/or one or more multiple symbol display position symbols of a plurality of symbol display position grids at a plurality of different depths. In these embodiments, the gaming system determines whether the symbols generated in a quantity of active symbol display positions form any winning symbol combinations.

It should be appreciated that in one embodiment which utilizes a plurality of symbol display position grids, when determining if any awards are associated with the currently displayed symbols, the gaming system may evaluate symbols displayed at a plurality of symbol display positions of a plurality of symbol display position grids of a plurality of different depths. That is, since the gaming system of this embodiment only evaluates the symbols that are currently displayed to the player and different symbols positioned at different depths may be currently displayed to the player (due to the removal and/or shifting of symbols positioned in front of these symbols), the gaming system is configured to evaluate symbols displayed at different depths to determine any additional awards to provide to the player. Such a configuration provides the player with additional opportunities to win awards in association with a plurality of grids of symbol display positions.

In different embodiments, the awards associated with one or more symbols or winning symbol combinations include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display the cascading symbol game. In another embodiment, in addition or in alternative to each electronic gaming machine displaying the cascading symbol game, the gaming system causes one or more community or overhead display devices to display part or all of the cascading symbol game to one or more other players or bystanders either at a gaming establishment or viewing over a network, such as the internet. In another embodiment, in addition or in alternative to each electronic gaming machine displaying the cascading symbol game, the gaming system causes one or more internet sites to each display the cascading symbol game such that a player is enabled to log on from a personal web browser. In another such embodiment, the gaming system enables the player to play one or more games on one device while viewing the cascading symbol game from another device, such as a desktop or laptop computer.

In one embodiment, as described above, a cascading symbol game is a primary or base wagering game. In this embodiment, upon a placement of a wager by a player, the gaming system triggers a play of the cascading symbol game.

In another embodiment, the cascading symbol game is a secondary or bonus game which is triggered in response to an occurrence of a cascading symbol game triggering event. In one such embodiment, a cascading symbol game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a cascading symbol game triggering event to occur.

In another embodiment, the gaming system does not provide any apparent reasons to the players for a cascading symbol game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one such embodiment, a cascading symbol game triggering event occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a cascading symbol game triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a cascading symbol game triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a cascading symbol game triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a players status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a cascading symbol game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a cascading symbol game triggering event occurs, based on a quantity of games played. In this embodiment, a quantity of games played is set for when one or more of such events or conditions will occur. In one embodiment, such a set quantity of games played is based on historic data.

In another alternative embodiment, a cascading symbol game triggering event occurs, based on time. In this embodiment, a time is set for when one or more of such events or conditions will occur. In one embodiment, such a set time is based on historic data.

In another alternative embodiment, a cascading symbol game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a cascading symbol game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a cascading symbol game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a cascading symbol game triggering event to occur may be implemented in accordance with the gaming system and method disclosed herein.

It should be appreciated that any of the above-described cascading symbol game triggering events may be combined in one or more different embodiments.

It should be appreciated that any of the embodiments disclosed herein may be implemented in a non-tumbling reels configuration. In one such embodiment, the gaming system does not remove and/or shift any symbols, but proceeds with determining if any multiple symbol display position symbols are displayed. In another such embodiment, the gaming system removes zero, one or more symbols but after such removal of zero, one or more generated symbols, the gaming system does not shift zero, one or more symbols to fill zero, one or more empty symbol displays. In this embodiment, the gaming system generates zero, one or more symbols in any created empty symbol display positions and proceeds with determining if any multiple symbol display position symbols are displayed. In one such embodiment, the gaming system generates zero, one or more designated symbols, such as zero, one or more bonus symbols or wild symbols in any created empty symbol display positions.

Alternative Embodiments

It should be appreciated that in different embodiments, one or more of:

xliv. a shape or configuration of each symbol display position grid;

xlv. a quantity of rows in each symbol display position grid;

xlvi. a quantity of columns in each symbol display position grid;

xlvii. a quantity of symbol display positions of or otherwise associated with one or more multiple symbol display position symbols (i.e., a size of one or more multiple symbol display position symbols);

xlviii. a quantity of symbols of or otherwise associated with one or more multiple symbol display position symbols;

xlix. a quantity of symbols generated;

l. a quantity of multiple symbol display position symbols generated;

li. which symbols and/or multiple symbol display position symbols are shifted;

lii. which symbols and/or multiple symbol display position symbols retain their original positioning;

liii. a determination of if one or more symbols will be removed;

liv. which symbol combinations are winning symbol combinations;

lv. which awards are associated with which winning symbol combinations;

lvi. which symbols, if any, are removed from which symbol display position grids;

lvii. which multiple symbol display position symbols, if any, are removed from which symbol display position grids;

lviii. a quantity of symbol display position grids;

lix. a quantity of symbol display positions in each symbol display position grid;

lx. a direction of any shifting of any symbols and/or any multiple symbol display position symbols;

lxi. which symbols and/or multiple symbol display position symbols are available to be generated in each symbol display position grid;

lxii. a duration of time a symbol and/or a multiple symbol display position symbol will remain at one of the symbol display positions;

lxiii. a quantity of winning symbols combinations which a symbol will remain at one of the symbol display positions;

lxiv. a quantity of satisfactions of the removal qualification condition which a multiple symbol display position symbol will remain at the same plurality of the symbol display positions;

lxv. a quantity of symbol shifts a symbol will remain at one of the symbol display positions;

lxvi. a quantity of shifts a multiple symbol display position symbol will remain at the same plurality of symbol display positions;

lxvii. a quantity of games played in which a symbol will remain at one of the symbol display positions;

lxviii. a quantity of games played in which a multiple symbol display position symbol will remain at the same plurality of symbol display positions;

lxix. a determination of whether to enable a player to make any inputs to hold any symbols and/or any multiple symbol display position symbols;

lxx. a determination of whether to enable a player to make any inputs to discard any symbols and/or any multiple symbol display position symbols; and/or lxxi. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
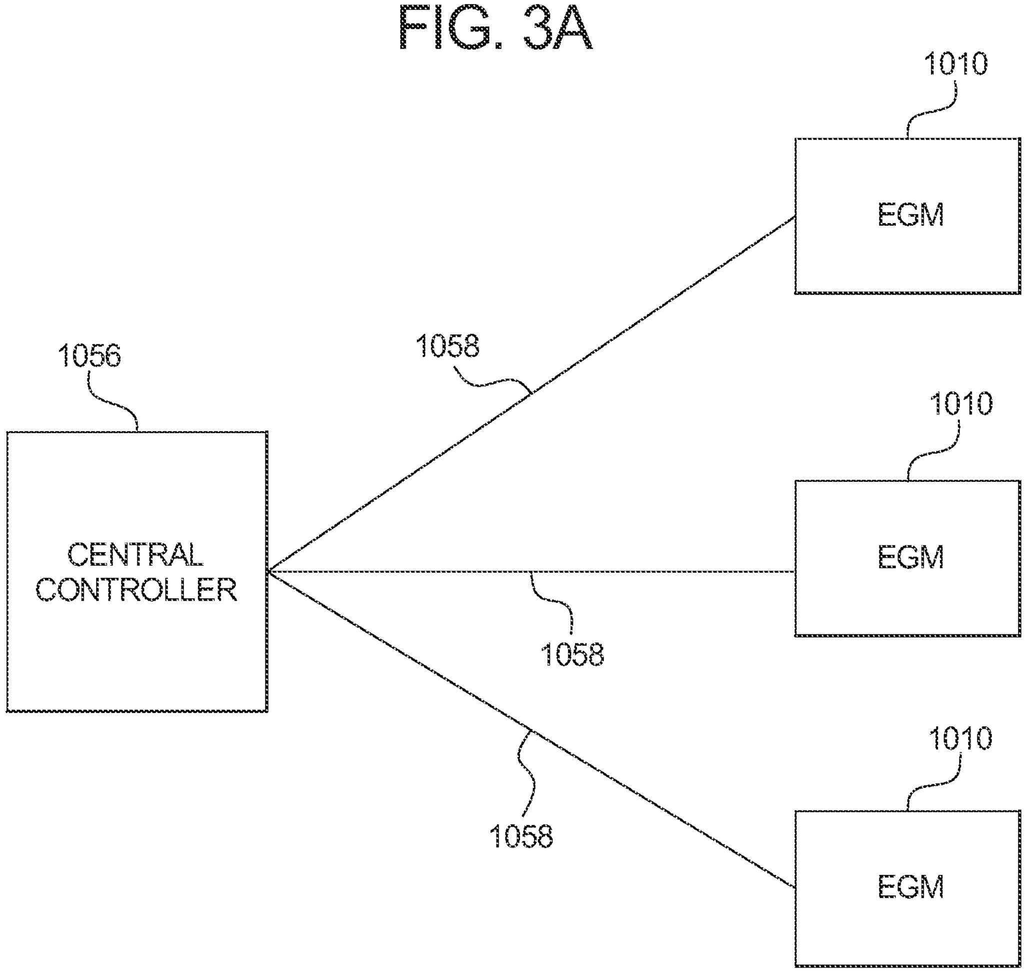
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such “thin client” embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such “thick client” embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 33 illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 33 includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 3B:
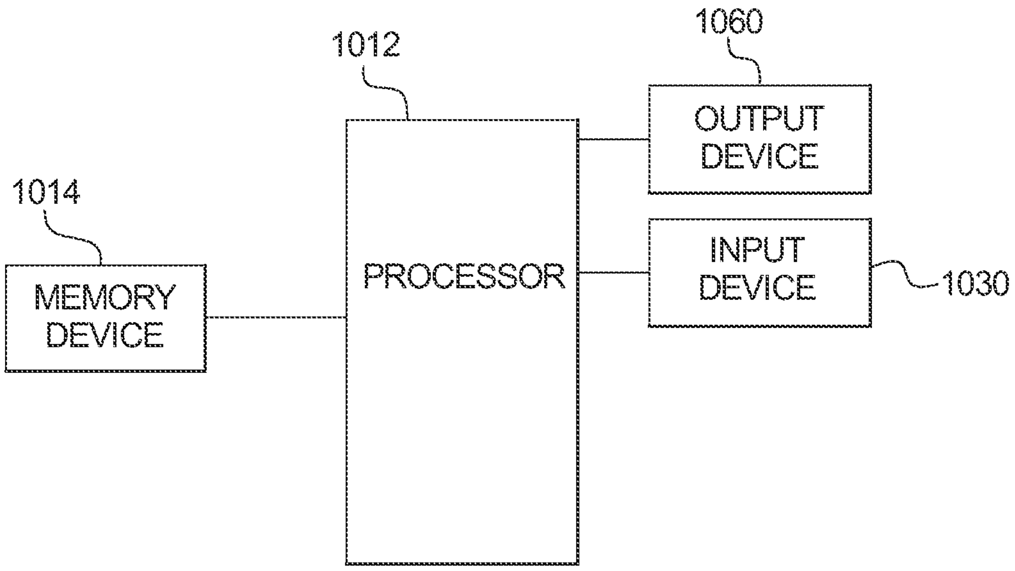
FIG. 3B is a schematic block diagram of one embodiment of an electronic configuration of the gaming system disclosed herein.
Figure 4A:
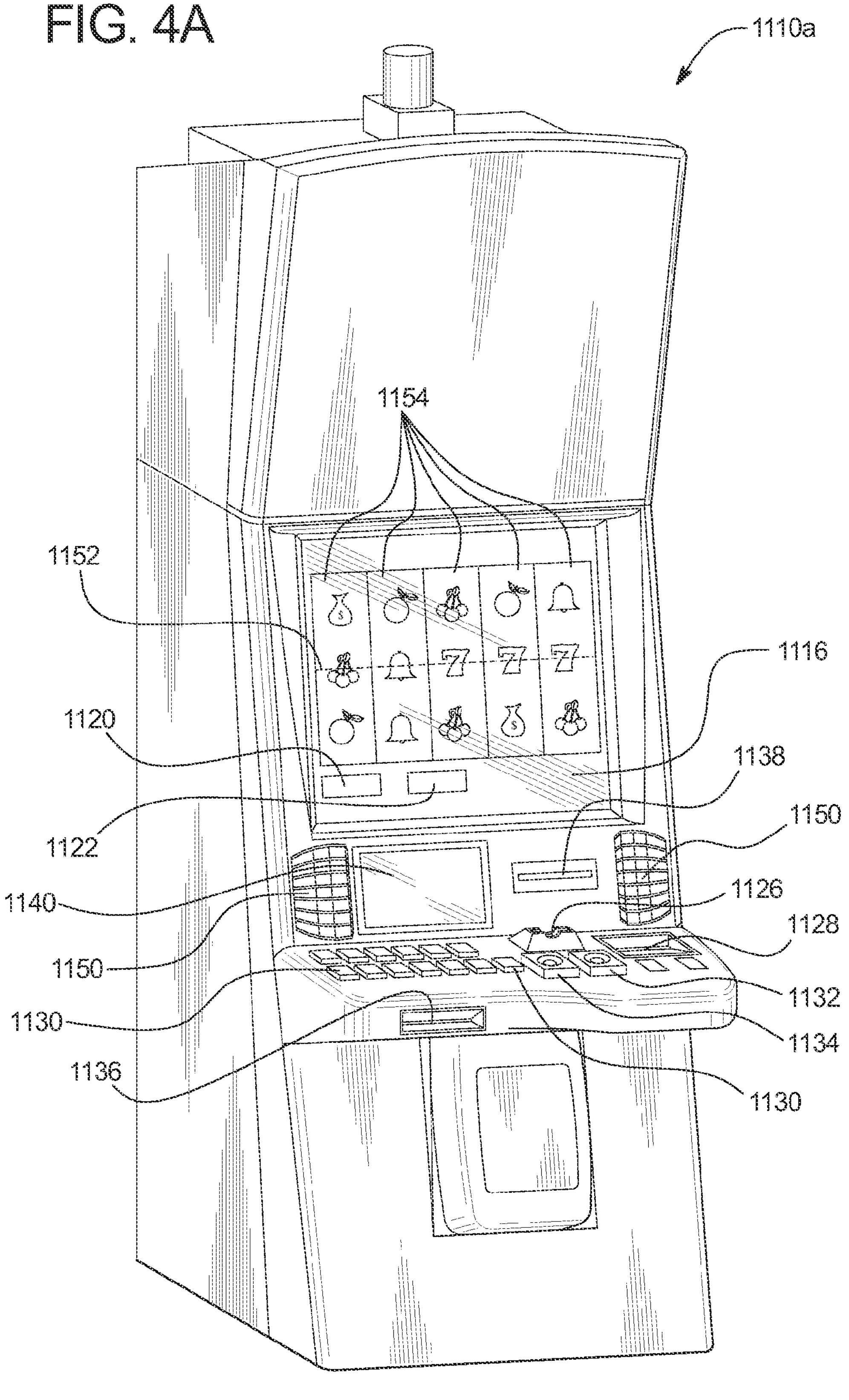
FIGS. 4A and 4B are perspective views of example alternative embodiments of the gaming system disclosed herein.
Figure 4B:
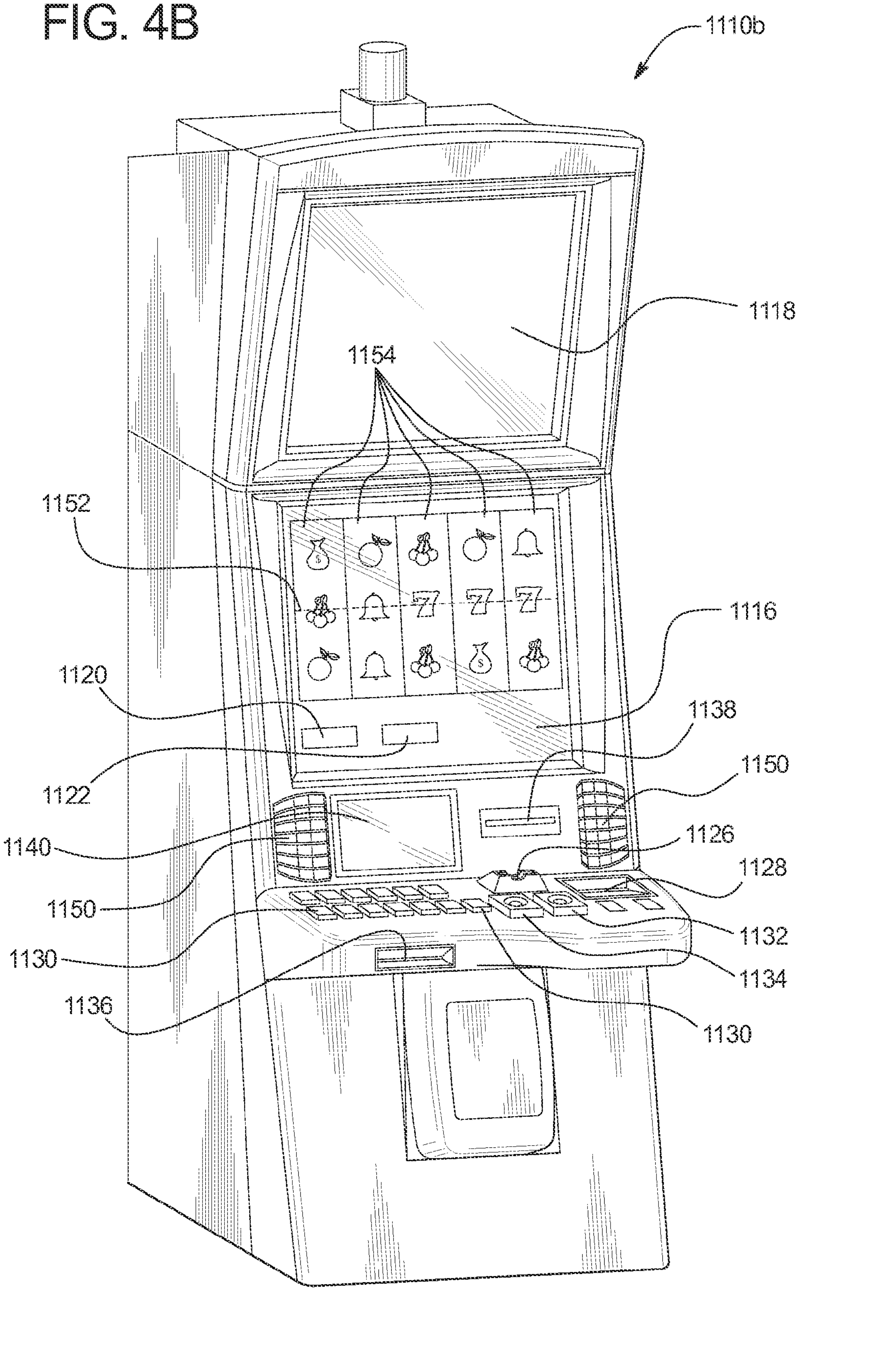

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified players gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a house;

at least one display device supported by the housing;

a plurality of input devices supported by the housing, said plurality of input devices including:

(i) an acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the acceptor, establish a credit balance based, at least in part, on a monetary value associated with the received physical item, (b) for a play of a game:

(i) display one of a plurality of available symbols at each of a plurality of symbols display positions of each of a plurality of symbol display position matrices, wherein prior to any symbols being displayed at any symbol display positions for the play of the game, the plurality of available symbols include at least one multiple symbol display position symbol associated with at least two of the symbol display positions, (ii) for each symbol display position matrix:

(A) determine if any of the symbols displayed at the symbol display positions of said symbol display position matrix form any winning symbol combinations, and (B) if a plurality of the displayed symbols form at least one winning symbol combination, display one of a plurality of awards for each displayed winning symbol combination, (iii) if the multiple symbol display position symbol is displayed at symbol display positions of at least two of the symbol display position matrices, trigger at least one feature associated with the play of the game, (iv) determine whether each displayed symbol qualifies to be removed, and (v) if at least one of the displayed symbols qualifies to be removed:

(A) for each displayed symbol that qualifies to be removed, remove said symbol, (B) reposition a quantity of any remaining displayed symbols, (C) for each created empty symbol display position, display one of the plurality of symbols, and (D) repeat (b)(ii) to (b)(v) at least once, and (c) if a cashout input is received via the cashout device, cause an initiation of any payout associated with the credit balance.

2. The gaming system of claim 1, wherein the repositioned quantity of any remaining displayed symbols is zero.

3. The gaming system of claim 1, wherein at least a first one of the symbol display positions of a first one of the symbol display position matrices is linked to at least a first one of the symbol display positions of a second one of the symbol display position matrices.

4. The gaming system of claim 3, wherein the at least one triggered feature includes enabling at least one remaining displayed symbol to be repositioned from the first one of the symbol display positions of the first one of the symbol display position matrices to the linked first one of the symbol display positions of the second one of the symbol display position matrices.

5. The gaming system of claim 1, wherein the at least one triggered feature includes at least one selected from the group consisting of: a modification of a modifier associated with the play of the game, a modification of a non-wild symbol to a wild symbol, an initiation of a play of a secondary game, a modification of a paytable associated with the play of the game, and a modification of a multiplier associated with a wild symbol.

6. The gaming system of claim 1, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

7. The gaming system of claim 1, wherein when executed by the at least one processor if at least one of the displayed symbols qualifies to be removed, the plurality of instructions cause the at least one processor to repeat (b)(ii) to (b)(v) until no symbols qualify to be removed.

8. A method of operating a gaming system, for a play of a game said method comprising:

(a) causing at least one display device to display one of a plurality of available symbols at each of a plurality of symbol display positions of each of a plurality of symbol display position matrices, wherein prior to any symbols being displayed at any symbol display positions for the play of the game, the plurality of available symbols include at least one multiple symbol display position symbol associated with at least two of the symbol display positions, (b) for each symbol display position matrix:

(i) causing at least one processor to execute a plurality of instructions to determine if any of the symbols displayed at the symbol display positions of said symbol display position matrix form any winning symbol combinations, and (ii) if a plurality of the displayed symbols form at least one winning symbol combination, causing the at least one display device to display one of a plurality of awards for each displayed winning symbol combination, wherein a credit balance is increasable based on any award displayed for any displayed winning symbol combination, said credit balance being increasable via an acceptor of a physical item associated with a monetary value, and said credit balance being decreasable via a cashout device, (c) if the multiple symbol display position symbol is displayed at symbol display positions of at least two of the symbol display position matrices, causing the at least one processor to execute the plurality of instructions to trigger at least one feature associated with the play of the game, (d) causing the at least one processor to execute the plurality of instructions to determine whether each displayed symbol qualifies to be removed, and (e) if at least one of the displayed symbols qualifies to be removed:

(i) for each displayed symbol that qualifies to be removed, causing the at least one processor to execute the plurality of instructions to remove said symbol, (ii) causing the at least one processor to execute the plurality of instructions to reposition a quantity of any remaining displayed symbols, (iii) for each created empty symbol display position, causing the at least one display device to display one of the plurality of symbols, and (iv) repeating (b) to (e) at least once.

9. The method of claim 8, wherein the repositioned quantity of any remaining displayed symbols is zero.

10. The method of claim 8, wherein at least a first one of the symbol display positions of a first one of the symbol display position matrices is linked to at least a first one of the symbol display positions of a second one of the symbol display position matrices.

11. The method of claim 10, wherein the at least one triggered feature includes enabling at least one remaining displayed symbol to be repositioned from the first one of the symbol display positions of the first one of the symbol display position matrices to the linked first one of the symbol display positions of the second one of the symbol display position matrices.

12. The method of claim 8, wherein the at least one triggered feature includes at least one selected from the group consisting of: a modification of a modifier associated with the play of the game, a modification of a non-wild symbol to a wild symbol, an initiation of a play of a secondary game, a modification of a paytable associated with the play of the game, and a modification of a multiplier associated with a wild symbol.

13. The method of claim 8, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

14. The method of claim 8, which includes, if at least one of the displayed symbols qualifies to be removed, repeating (b) to (e) until no symbols qualify to be removed.

15. The method of claim 8, which is executed through a data network.

16. The method of claim 15, wherein the data network is an internet.

17. A gaming system server comprising:

at least one processor; and at least one memory device which stores a plurality of instructions, which when executed by the at least one processor, cause the at least one processor, for a play of a game, to:

(a) cause at least one display device to display one of a plurality of available symbols at each of a plurality of symbol display positions of each of a plurality of symbol display position matrices, wherein prior to any symbols being displayed at any symbol display positions for the play of the game, the plurality of available symbols include at least one multiple symbol display position symbol associated with at least two of the symbol display positions, (b) for each symbol display position matrix:

(i) determine if any of the symbols displayed at the symbol display positions of said symbol display position matrix form any winning symbol combinations, and (ii) if a plurality of the displayed symbols form at least one winning symbol combination, cause the at least one display device to display one of a plurality of awards for each displayed winning symbol combination, wherein a credit balance is increasable based on any award displayed for any displayed winning symbol combination, said credit balance being increasable via an acceptor of a physical item associated with a monetary value, and said credit balance being decreasable via a cashout device, (c) if the multiple symbol display position symbol is displayed at symbol display positions of at least two of the symbol display position matrices, trigger at least one feature associated with the play of the game, (d) determine whether each displayed symbol qualifies to be removed, and (e) if at least one of the displayed symbols qualifies to be removed:

(i) for each displayed symbol that qualifies to be removed, remove said symbol, (ii) reposition a quantity of any remaining displayed symbols, (iii) for each created empty symbol display position, cause the at least one display device to display one of the plurality of symbols, and (iv) repeat (b) to (e) at least once.

18. The gaming system server of claim 17, wherein the repositioned quantity of any remaining displayed symbols is zero.

19. The gaming system server of claim 17, wherein at least a first one of the symbol display positions of a first one of the symbol display position matrices is linked to at least a first one of the symbol display positions of a second one of the symbol display position matrices.

20. The gaming system server of claim 19, wherein the at least one triggered feature includes enabling at least one remaining displayed symbol to be repositioned from the first one of the symbol display positions of the first one of the symbol display position matrices to the linked first one of the symbol display positions of the second one of the symbol display position matrices.

21. The gaming system server of claim 17, wherein the at least one triggered feature includes at least one selected from the group consisting of: a modification of a modifier associated with the play of the game, a modification of a non-wild symbol to a wild symbol, an initiation of a play of a secondary game, a modification of a paytable associated with the play of the game, and a modification of a multiplier associated with a wild symbol.

22. The gaming system server of claim 17, wherein the plurality of awards include at least one selected from the group consisting of: a quantity of monetary credits, a quantity of non-monetary credits, a quantity of promotional credits, a quantity of player tracking points, a progressive award, a modifier, a quantity of free plays of the game, a quantity of plays of at least one non-wagering game, at least one lottery based award, a wager match for at least one play of the game, an increase in an average expected payback percentage of the game, at least one comp, a quantity of credits usable for an online play of an online game, a quantity of virtual goods and an access code usable to unlock content on an internet.

23. The gaming system server of claim 17, wherein when executed by the at least one processor if at least one of the displayed symbols qualifies to be removed, the plurality of instructions cause the at least one processor to repeat (b) to (e) until no symbols qualify to be removed.

* * * * *